(12) United States Patent
Struhsaker et al.

(10) Patent No.: US 10,993,124 B2
(45) Date of Patent: Apr. 27, 2021

(54) BEAM-STEERING SATELLITE COMMUNICATION TERMINAL FOR FIELD ENVIRONMENTS

(71) Applicant: TIONESTA, LLC, Austin, TX (US)

(72) Inventors: Paul Struhsaker, Austin, TX (US); Paul Posner, Austin, TX (US); James Gitre, Austin, TX (US); Amir Keyvan Khandani, Austin, TX (US)

(73) Assignee: CTH LENDING COMPANY, LLC, Pittsburgh, PA (US)

( * ) Notice: Subject to any disclaimer, the term of this patent is extended or adjusted under 35 U.S.C. 154(b) by 0 days.

(21) Appl. No.: 16/413,734

(22) Filed: May 16, 2019

(65) Prior Publication Data
US 2020/0367069 A1 Nov. 19, 2020

(51) Int. Cl.
*H04W 84/06* (2009.01)
*H04W 16/28* (2009.01)
(Continued)

(52) U.S. Cl.
CPC ........ *H04W 16/28* (2013.01); *H04B 7/18593* (2013.01); *H04B 7/18597* (2013.01);
(Continued)

(58) Field of Classification Search
CPC ............ H04B 7/18513; H04B 7/18515; H04B 7/18517; H04B 7/18593; H04B 7/18597; H04L 67/12; H01Q 1/1264; H01Q 1/1235; H01Q 1/288; H01Q 1/3208; H01Q 1/42; H01Q 3/02; H01Q 3/30; H01Q 3/04; H01Q 5/50; H01Q 15/0086; H01Q 21/0012;
(Continued)

(56) References Cited

U.S. PATENT DOCUMENTS 6,570,859 B1 *  5/2003  Cable ................. H04B 7/18515
                                                 370/316
6,591,084 B1    7/2003  Chuprun et al.
(Continued)

FOREIGN PATENT DOCUMENTS

EP        2765649 A2    8/2014

OTHER PUBLICATIONS

Sturdivant et al, Systems Engineering of a Terabit Elliptic Orbit Satellite and Phased Array Ground Station for IoT Connectivity and Consumer Internet Access, IEEE, 17 pages, Jul. 2016.*
(Continued)

*Primary Examiner* — Frank Duong
(74) *Attorney, Agent, or Firm* — Osha Bergman Watanabe & Burton LLP

(57) ABSTRACT

A satellite communication terminal for a field environment includes: a broadband interface that creates a broadband link with a device in the field environment and that manages communication over the broadband link; a satellite antenna that creates a satellite backhaul link with a satellite in orbit; a satellite interface that manages communication over the satellite backhaul link; and a processor that controls a beam direction of the satellite antenna, performs broadband services on data exchanged with the device over the broadband link and the satellite backhaul link, and provides access to the exchanged data to the device.

17 Claims, 24 Drawing Sheets

(51) Int. Cl.
  *H04W 36/00* (2009.01)
  *H04B 7/185* (2006.01)
  *H04L 29/08* (2006.01)
  *H04W 16/26* (2009.01)
  *H04W 64/00* (2009.01)

(52) U.S. Cl.
  CPC ............. *H04L 67/12* (2013.01); *H04W 16/26* (2013.01); *H04W 36/0009* (2018.08); *H04W 64/006* (2013.01)

(58) Field of Classification Search
  CPC ... H01Q 221/065; H01Q 21/24; H04W 16/26; H04W 36/0009; H04W 16/28; H04W 64/006
  See application file for complete search history.

(56) References Cited

U.S. PATENT DOCUMENTS

| | | | |
|---|---|---|---|
| 7,778,230 B2 * | 8/2010 | Fulknier | H04L 45/00 370/338 |
| 8,050,628 B2 * | 11/2011 | Wahlberg | H04B 7/18536 455/63.1 |
| 9,565,633 B2 * | 2/2017 | Samardzija | H04W 4/80 |
| 9,621,850 B1 | 4/2017 | Mitchell | |
| 9,882,279 B2 * | 1/2018 | Bull | H04W 16/28 |
| 10,135,113 B2 * | 11/2018 | Fotheringham | H01Q 21/065 |
| 10,700,769 B2 * | 6/2020 | Wang | H04W 72/14 |
| 2005/0124315 A1 * | 6/2005 | Kageyama | H04B 7/18597 455/403 |
| 2015/0365870 A1 | 12/2015 | Lauer | |
| 2018/0316416 A1 * | 11/2018 | Reis | H04B 7/18513 |
| 2020/0100291 A1 * | 3/2020 | Ravishankar | H04W 74/0833 |
| 2020/0119811 A1 * | 4/2020 | Kay | H04B 7/18513 |

OTHER PUBLICATIONS

De Sanctis et al, Satellite Communications Supporting Internet of Remote Things, IEEE, 11 pages, Feb. 2016.*
Liu et al, Space-Air-Ground Integrated Network: A Survey, IEEE, 28 pages, 2018.*
Partial European Search Report in corresponding European Application No. 20167373.8, dated Oct. 27, 2020 (16 pages).

* cited by examiner

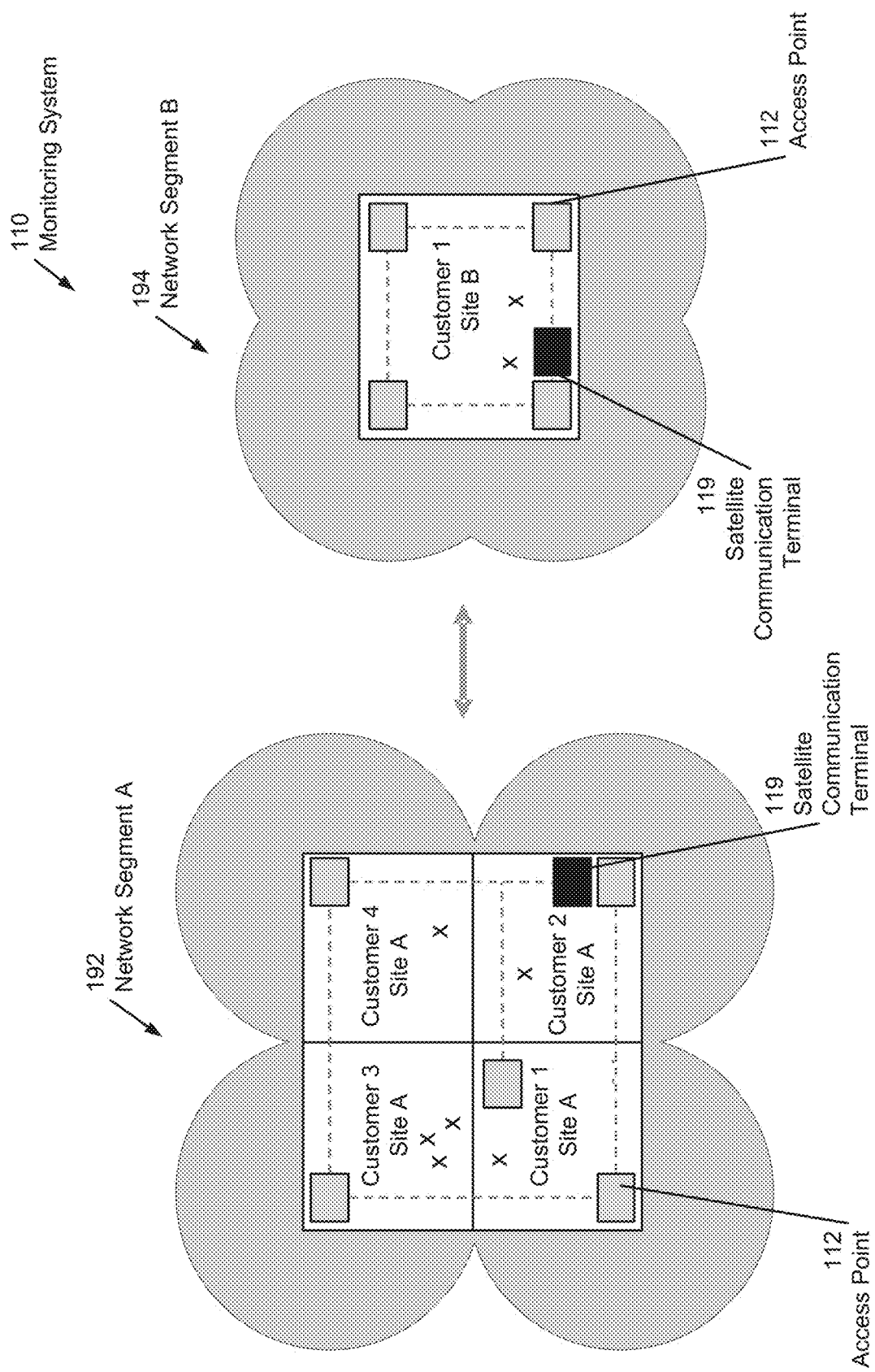

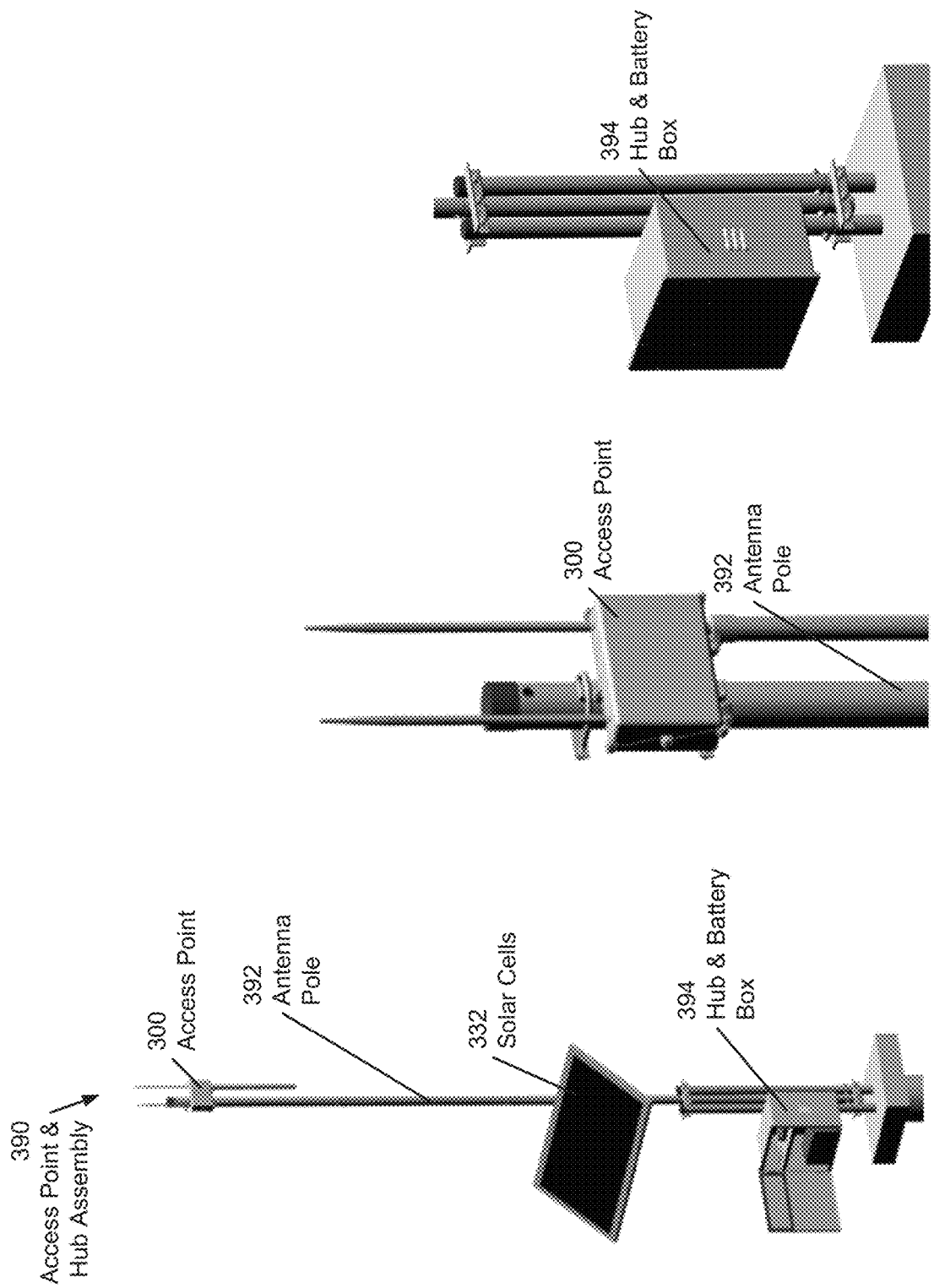

BEAM-STEERING SATELLITE COMMUNICATION TERMINAL FOR FIELD ENVIRONMENTS

BACKGROUND

A growing number of broadband satellite constellations are being launched to support communication networks around the world, even in the most remote field environments. Remote field environments often have minimal or no satellite networking infrastructure to interact with these satellite constellation. Accordingly, a satellite communication terminal that communicates with satellites in orbit and that established and maintains a local network on the ground can be beneficial users operating in or travelling across the field environment. Furthermore, a satellite communication terminal that provides access to the internet, a cloud computing platform, a sensor network, or a monitoring system can be beneficial or even essential to the user.

SUMMARY

In general, one or more embodiments of the invention relate to a satellite communication terminal for a field environment. The satellite communication terminal comprises: a broadband interface that creates a broadband link with a device in the field environment and that manages communication over the broadband link; a satellite antenna that creates a satellite backhaul link with a satellite in orbit; a satellite interface that manages communication over the satellite backhaul link; and a processor that controls a beam direction of the satellite antenna, performs broadband services on data exchanged with the device over the broadband link and the satellite backhaul link, and provides access to the exchanged data to the device.

In general, one or more embodiments of the invention relate to a method of managing a satellite communication terminal in a field environment. The method comprises: creating a broadband link between the satellite communication terminal and a device in the field environment; exchanging data between the satellite communication terminal and the device over the broadband link; creating a satellite backhaul link between the satellite communication terminal and a satellite in orbit; exchanging the data between the satellite communication terminal and the satellite over the satellite backhaul link; performing broadband services on the exchanged data; controlling a beam direction of a satellite antenna to maintain the satellite backhaul link; and providing access to the exchanged data to the device.

In general, one or more embodiments of the invention relate to a satellite communication system for a field environment. The satellite communication system comprises: a device in the field environment; a satellite in orbit; and a satellite communication terminal. The satellite communication terminal includes: a broadband interface that creates a broadband link with a device in the field environment and that manages communication over the broadband link; a satellite antenna that creates a satellite backhaul link with a satellite in orbit; a satellite interface that manages communication over the satellite backhaul link; and a processor that controls a beam direction of the satellite antenna, performs broadband services on data exchanged with the device over the broadband link and the satellite backhaul link and provides access to the exchanged data to the device.

BRIEF DESCRIPTION OF DRAWINGS

FIGS. 1A-1J show satellite communication systems in field environments, in accordance with one or more embodiments of the invention.

FIGS. 3A-3G show access points of a satellite communication system, in accordance with one or more embodiments of the invention.

DETAILED DESCRIPTION

Figure 1A:
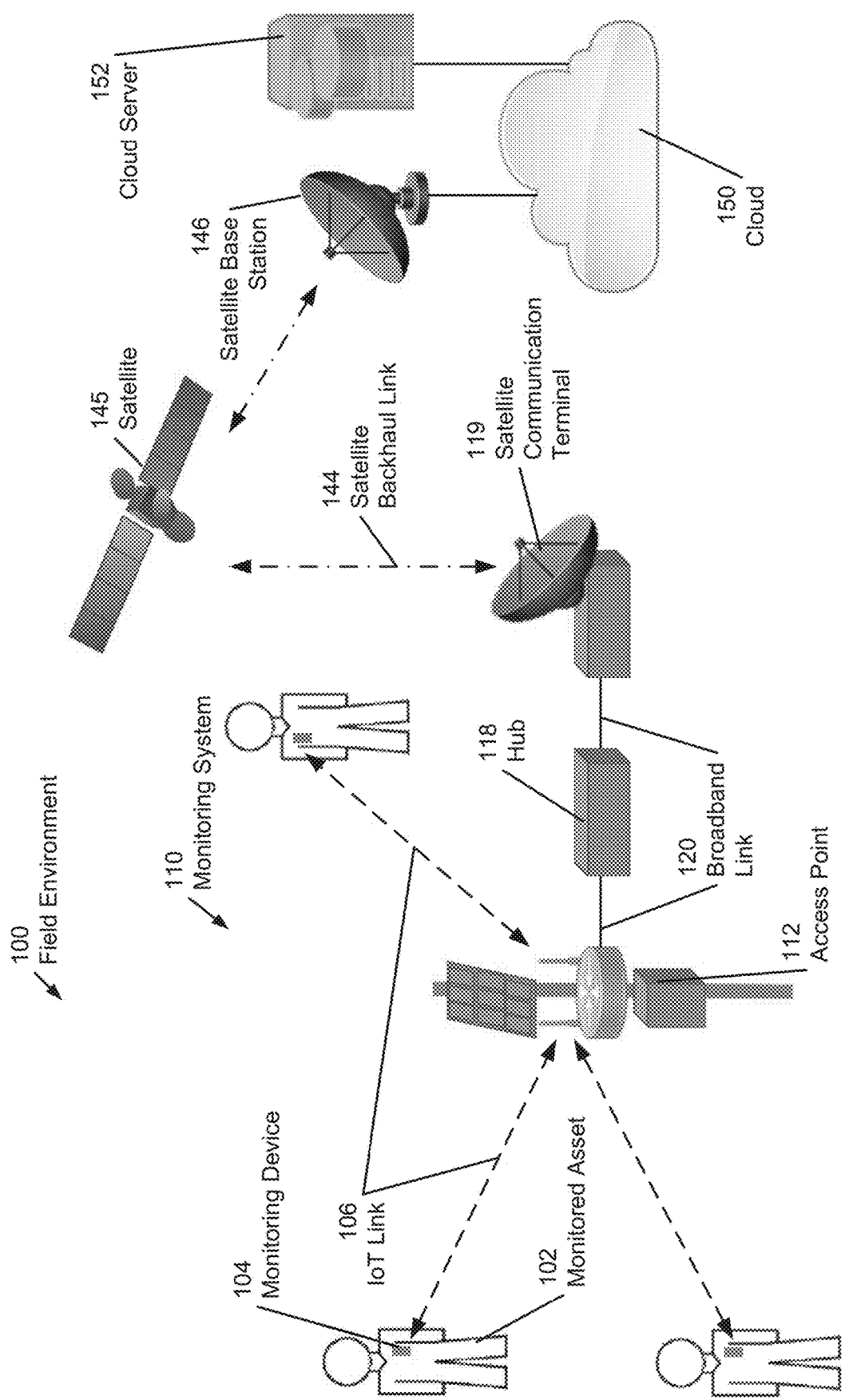

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although multiply dependent claims are not introduced, it would be apparent to one of ordinary skill that the subject matter of the dependent claims of one or more embodiments may be combined with other dependent claims.

In general, embodiments of the invention are directed to a satellite communication terminal, a method of operating the satellite communication terminal, and a system including the satellite communication terminal that provide access to communication satellites in orbit and provide local networking capabilities.

Embodiments of the invention may be used in any field environment, including commercial, industrial, residential and natural environments of any size. Further, the communication network supported by the satellite communication terminal applies to any type of communication or exchange of information (e.g., voice, text, video, multimedia, sensor, or monitoring data).

FIGS. 1A-1J show satellite communication systems in field environments, in accordance with one or more embodiments of the invention.

In one or more embodiments exemplified by FIG. 1A, a field environment 100 includes a satellite communication system comprising a monitoring system 110 and a satellite communication terminal 119. The field environment 100 may be any type of environment (e.g., an outdoor environment, an oil and gas facility, an area where environmental monitoring is performed, a national park, a remote location separated from networking infrastructure, a disaster site, a field hospital, etc.). A field environment 100 may also be an indoor environment (e.g., a warehouse, a school, a hospital, a prison, etc.). A field environment 100 may also include a combination of indoor and outdoor environments (e.g., a campus of a public or private institution). Any environment that is equipped with a satellite communication terminal 119 or user devices (e.g., smartphone 128, a laptop 130 shown in FIGS. 1D-1E) may be considered a field environment 100. Further, the local network is not limited to a monitoring system 110, but may provide any appropriate data service to various connected devices.

The satellite communication terminal 119 connects a local network (i.e., the monitoring system 110) in the field environment 100 with an external network or cloud computing platform (e.g., cloud 150) via a satellite backhaul link 144 to a satellite 145. The satellite 145 may be one or more geostationary or non-geostationary satellites (e.g., Low Earth Orbit (LEO) satellite) with a satellite radio transceiver. A field environment 100 anywhere on the planet may use the satellite communication terminal 119 to establish communications with the growing number of communication satellite constellations. The satellite 145 may relay communications with other satellites 145 or may directly relay communications to a satellite base station 146 connected to the cloud 150 or cloud server 152.

Within the field environment 100, monitored assets 102, may be tracked or monitored by the monitoring system 110. Monitored assets 102 may include stationary and/or moving assets. A moving asset 102 may be a person, an animal, equipment (e.g., a forklift truck), goods, products or other items, including luggage, shipments such as boxes or containers, etc. A stationary asset may be anything equipped with sensors to monitor function and/or environmental conditions. Examples for such stationary assets include weather stations, pumps, pipelines, refrigeration equipment, air quality sensors, etc. The monitoring may be performed by a monitoring device 104 that is carried by the monitored asset 102 or that is attached or installed on the monitored asset 102.

In one or more embodiments, a monitored asset 102 may be controlled via the monitoring system 110. A monitoring device 104 may interface with the monitored asset 102 to, for example, activate or deactivate functions, switch modes, etc. If the monitoring device 104 is also used for sensing, a closed loop operation via the monitoring system 110 may be implemented. Based on sensed conditions, the monitored asset may be controlled in order to change the sensed conditions.

In one or more embodiments, an access point 112 functions as an intervening device that facilitates one or more broadband links 120 and/or Internet of Things (IoT) links 106 between devices of the field environment 100. The access point 112 may be a permanent part of an established network infrastructure in the field environment 100 or a temporary installation to supplement the networking range, capacity, or capabilities of the satellite communication terminal 119. The access point 112 comprises multiple component described below with respect to FIG. 3B. The access point 112 may further interface with a hub 118 (i.e., an intervening device that also supplements the networking range, capacity, or capabilities of the satellite communication terminal 119), which may perform processing of the data received from the monitored assets 102 via the access points 112. The hub 118 may operate in conjunction with or independently from the satellite communication terminal 119, as described below.

In one or more embodiments, data gathered from the monitored assets 102 is uploaded to the cloud 150 and is made accessible to users via a processing platform described below with reference to FIG. 2F. Additionally, or alternatively, the data may also be locally accessible via the hub 118, satellite communication terminal 119, or via the access point 112. The access point 112 and the monitoring device 104 (e.g., a peripheral sensor) for monitoring assets 102 are subsequently described in detail, with reference to FIGS. 3B, 4, and 5.

Figure 1B:
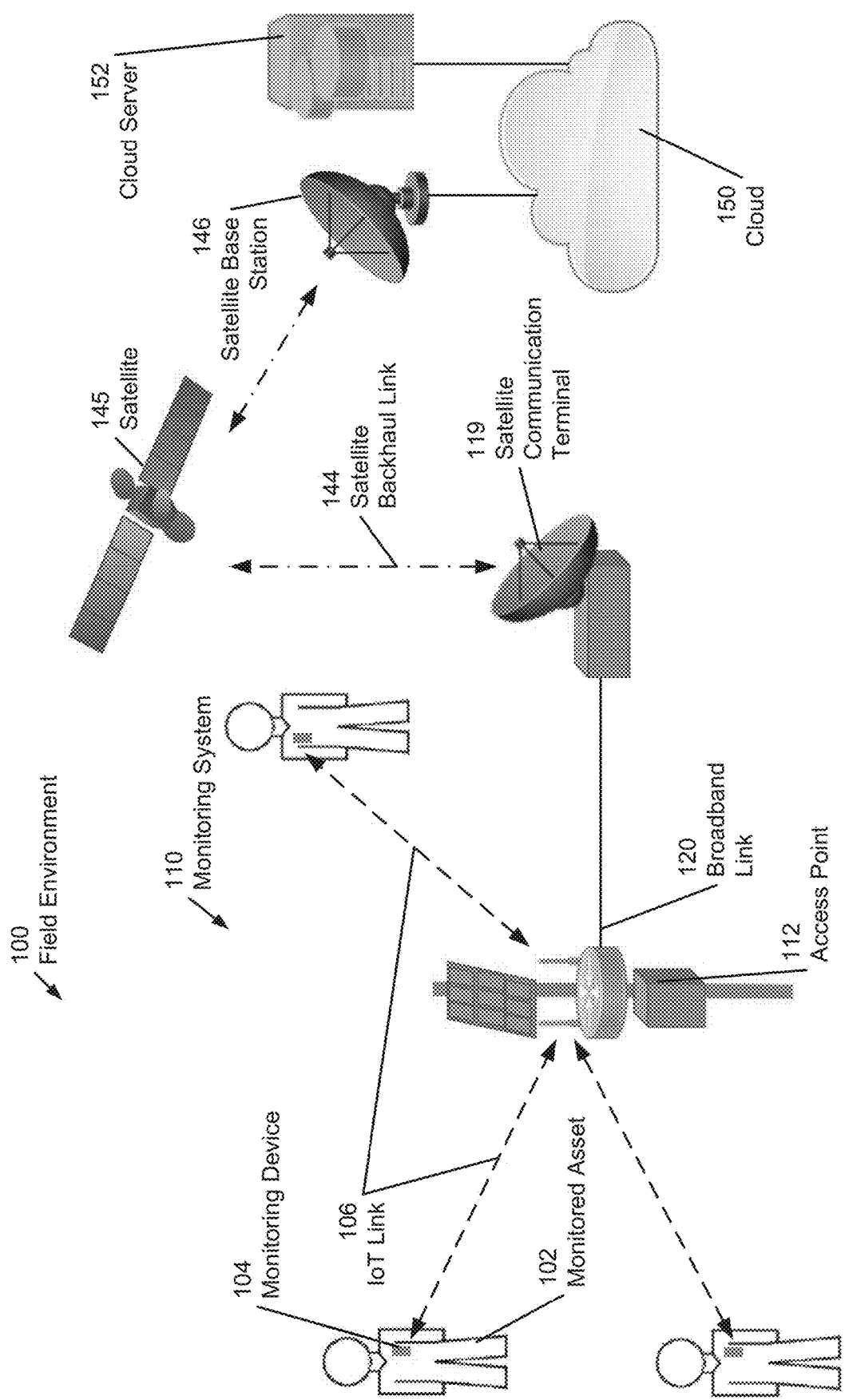

In one or more embodiments exemplified by FIG. 1B, an alternative configuration of the satellite communication system does not include the hub 118. The satellite communication terminal 119 may have the computing capacity to independently process all data and communications within the field environment 100. For example, a short range network can be quickly established by setting up the satellite communication terminal 119 and a single access point 112. If the network grows to a size that exceeds the processing capability of the satellite communication terminal 119, a hub 118 may be installed as an intervening device to supplement the networking range, capacity, or capabilities of the satellite communication terminal 119, as shown in FIG. 1A.

Figure 1C:
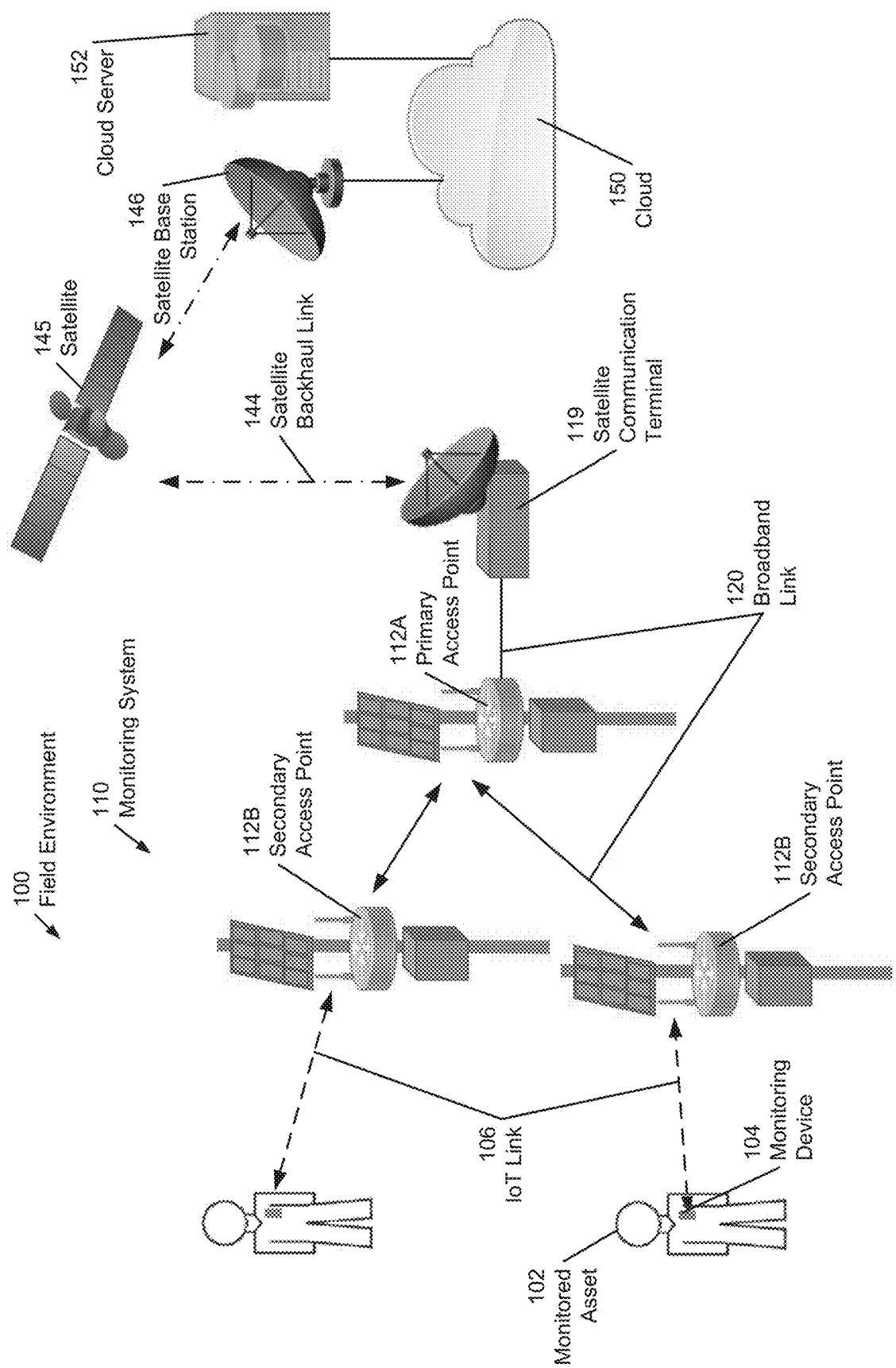

In one or more embodiments exemplified by FIG. 1C, an alternative configuration of the satellite communication system includes multiple access points 112A, 112B. Each access point 112 may have a limited range that may depend on the transmission power of the access point 112, but also on the transmission power of the monitoring devices 104 or other devices in the field environment 100. Accordingly, in order to extend the communication network across larger field environments 100, multiple access points 112A, 112B may be deployed at different locations in the environment. FIG. 1C shows a primary access point 112A and two secondary access points 112B. The primary access point 112A may directly interface with the satellite communication terminal 119. The secondary access points 112B may interface with the primary access point 112A using a broadband link 120 and therefore indirectly interface with the satellite communication terminal 119. The broadband link 120 may be a 10/100/1000 Mbps ethernet link, optical link, or any other appropriate wired communication link without departing from the invention. Alternatively, the broadband link 120 may be part of a wireless local area network (WLAN) based on a Wi-Fi standard (e.g., an 802.11 standard), an Internet of Things (IoT) standard, or any other appropriate wireless communication link without departing from the invention.

By using additional access points 112, distributed across the field environment 100, larger areas may thus be covered by the satellite communication system. Those skilled in the art will appreciate that various configurations of multiple access points 112 are feasible without departing from the invention. For example, the satellite communication system may include any number of access points 112 to cover a field environment 100 of any size. For example, a daisy chain configuration of multiple access points 112 (i.e., tertiary access points may interface with the secondary access points, analogous to how the secondary access points interface with the primary access point) may increase the covered area further. In hybrid configurations, some access points 112 may be daisy-chained, whereas other access points 112 may directly interface with a hub 118 or the satellite communication terminal 119.

Figure 1D:
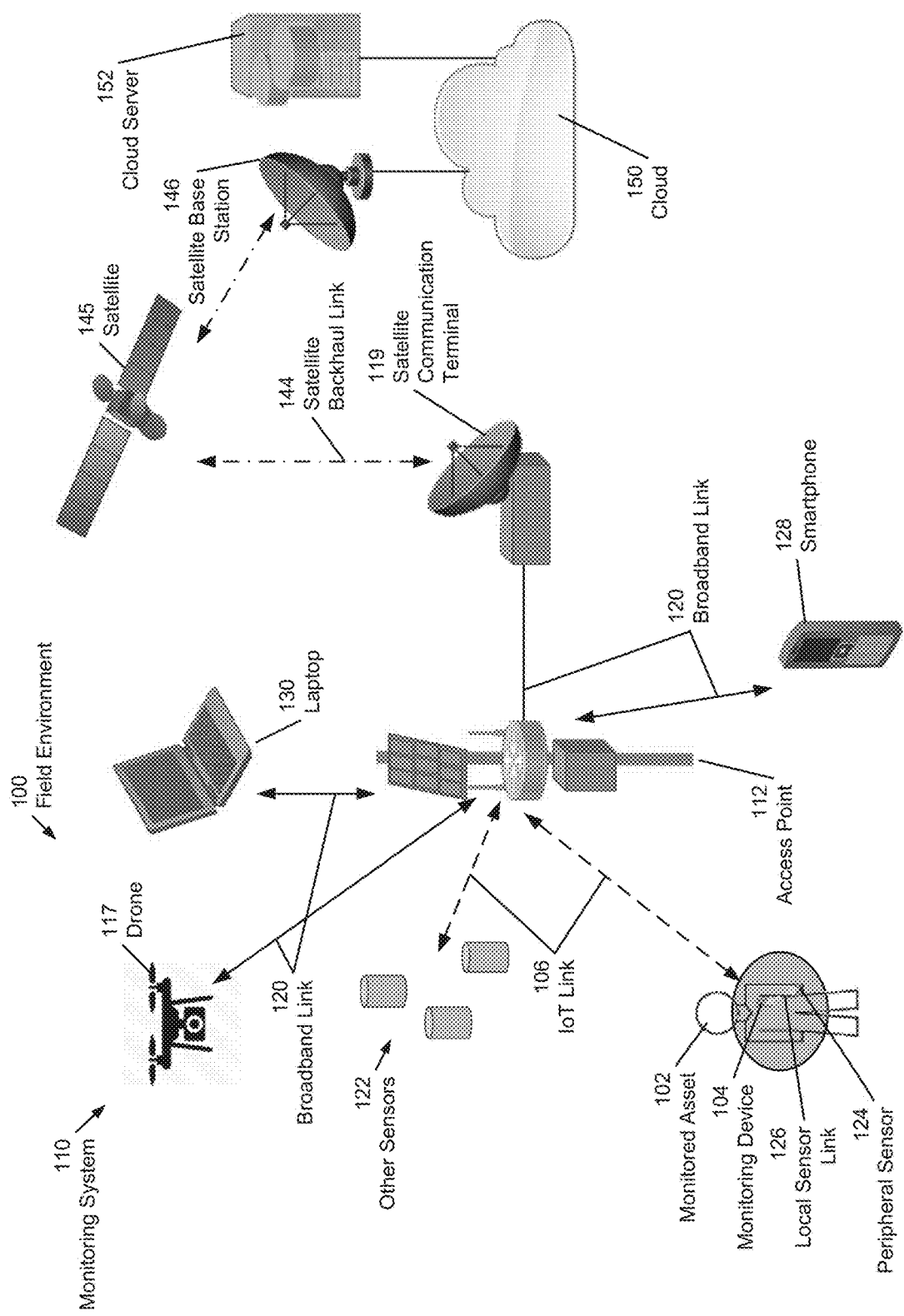

In one or more embodiments exemplified by FIG. 1D, an alternative configuration of the satellite communication system includes user devices. In one or more embodiments, the access point 112 is used to provide a user access to the communication network via a broadband link 120 to a smartphone 128 or laptop 130. Of course, the user devices may also connect directly to the satellite communication terminal 119 via a broadband link 120. Data that is provided by the monitoring devices 104 and/or monitoring device data that has been previously collected, processed and/or stored by the satellite communication terminal 119 may be obtained via a processing platform, described below with respect to FIG. 2F.

In one or more embodiments, a broadband link 120 may further be used to interface additional devices with access points 112 of the satellite communication system. For example, a drone 117 may communicate with the access point 112 via the broadband link 120 to relay real-time images, sensor information (e.g., LIDAR data, spectroscopic data, radiation data, survey information) to the communication network. The drone 117 may be in contact with various access points 112 depending on the drone's location in the field environment 100. The drone 117 may further not necessarily be in continuous contact with an access point 112 and may, instead, operate autonomously and may only require periodic contact with an access point 112. One or more drones 117 may be used to visually inspect the field environment 100. Multispectral cameras and/or mosaic photography may be used to monitor environmental conditions and/or activity in the field environment 100 using additional analytics software installed in the access point 112, a hub 118, or the satellite communication terminal 119.

In one or more embodiments, other sensors 122 that rely on a broadband link 120 or IoT link 106 to the access points 112 may be part of the satellite communication system as well. For example, cameras that are equipped with a Wi-Fi interface may be used to visually monitor certain areas of the field environment 100. Such cameras may include motion detection to detect activities including expected or desired activity, but also unexpected activity, such as intrusions. Additionally, or alternatively, cameras may provide still photos, video clips or live videos and/or alarms based on a detection of certain events in the videos or photos. Other sensors 122 may perform environmental measurements such as air temperature, humidity, or may be used to monitor equipment such as pumps, storage tanks, pipelines, etc.

In one or more embodiments, peripheral sensors 124 may be used to acquire additional measurements that may not be obtainable by a monitoring device 104 or a user device. Any number of peripheral sensors 124 may be used in conjunction with a monitoring device 104 or user device. A local sensor link 126 may transmit the measurements obtained by the peripheral sensor 124 to the monitoring device 104 or the user device, which may relay these measurements to one of the access points 112. An exemplary peripheral sensor is further discussed below, with respect to FIG. 5.

In one or more embodiments, other devices that rely on a broadband link 120 or IoT link 106 to the access points 112 may be part of the satellite communication system as well. The monitoring system is a non-limiting example of various different technologies connecting to a single communications network. However, the broadband link 120 may be used to connect one or more user devices for any purpose. For example, the user devices may be used for voice over IP (VOIP) calls, video calls, texting, general internet access, intranet access, and/or for any other data service).

In a non-limiting example, a smart phone 128 may connect via broadband link 120 to satellite communication terminal 119 and connect via satellite backhaul link 144 and the cloud 150 to an external cellular network to conduct a telephone call. Similarly, satellite communication terminal 119 may connect two smart phones 128 within the field environment 100 to conduct a telephone call without the support of an existing or external cellular network. Furthermore, the satellite communication terminal 119 may handle the transition of a telephone call to an external cellular network if one of the smart phones 128 leaves the field environment 100 and enters the coverage range of the external cellular network. While the above example is described with respect to telephone calls and an external cellular network, the invention is not limited to this data service or type of external network. For example, any appropriate type of data service may be managed internally within the field environment 100 and/or externally with an external network outside of the field environment 100.

In one or more embodiments of the invention, the access point 112 is a two-tier access point equipped with a first tier broadband communication interface and a second tier narrowband communication interface. The first tier broadband communication interface provides the broadband link 120 and the second tier narrowband interface provides the IoT link 106. While the narrowband link may provide coverage of a comparatively large area at a reduced data rate that may be particularly suitable for monitoring devices 104 and other sensors 122, the broadband link 120 may provide coverage of a comparatively smaller area at a higher data rate that may be suitable to serve other devices such as laptops 130, smartphones 128, or other broadband equipment, including drones 117, cameras (not shown), etc. The broadband link 120 may further be used to establish a mesh network with other access points 112, as previously shown in FIG. 1C. In one or more embodiments, the satellite communication system includes a three-tier network that, in addition to the two tiers of the access point 112, includes a third tier formed by the local sensor link 126, as previously described.

Figure 1E:
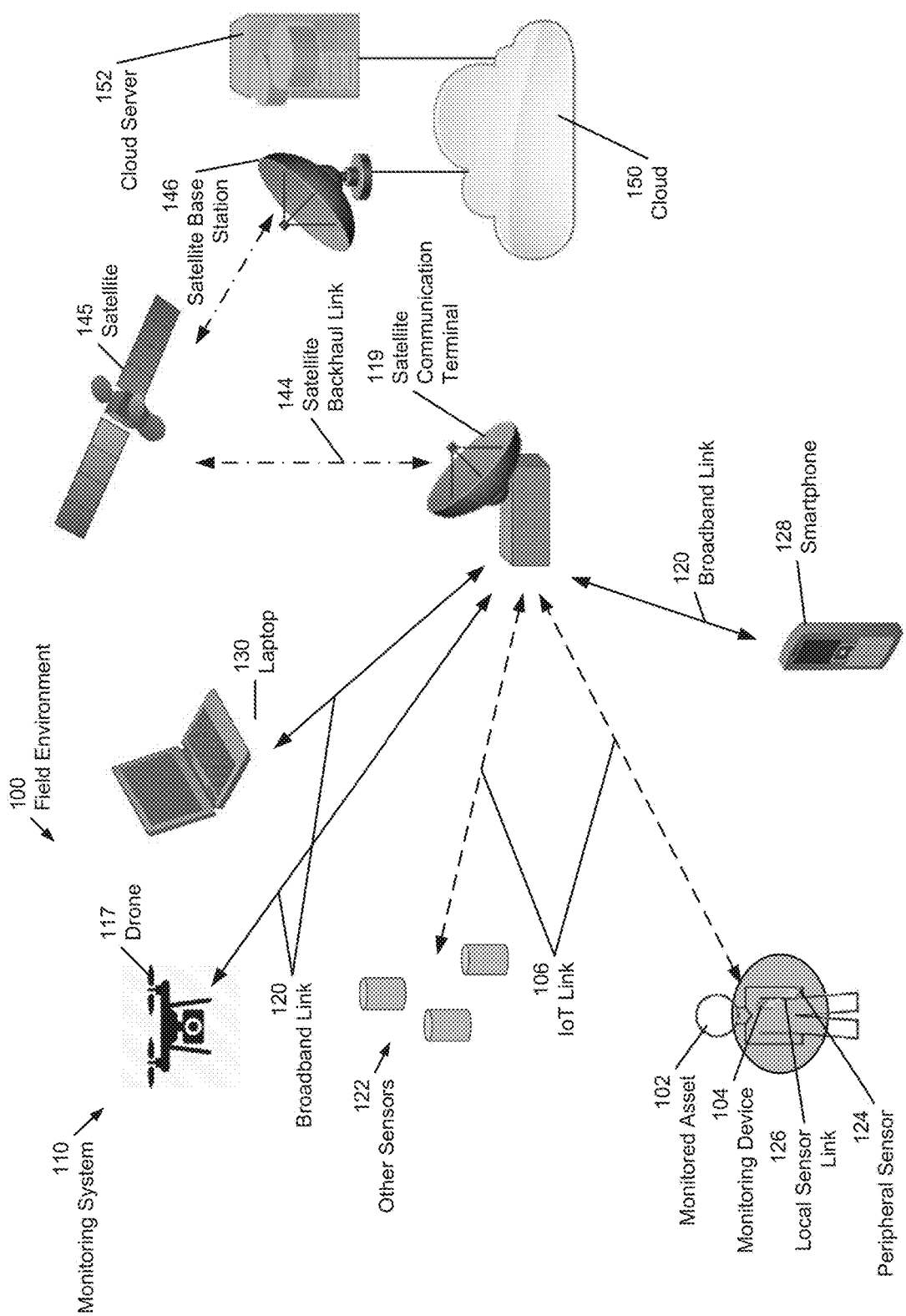

In one or more embodiments exemplified by FIG. 1E, the satellite communication terminal 119 may directly connect with the various devices in the field environment 100 via broadband links 120 or IoT links 106. The satellite communication terminal 119 is a communications network in a box that may independently create and maintain a one-, two-, or three-tier network described above. Intervening devices (e.g., an access point 112 or a hub 118) merely supplement the networking range, capacity, or capabilities of the satellite communication terminal 119.

Figure 1F:
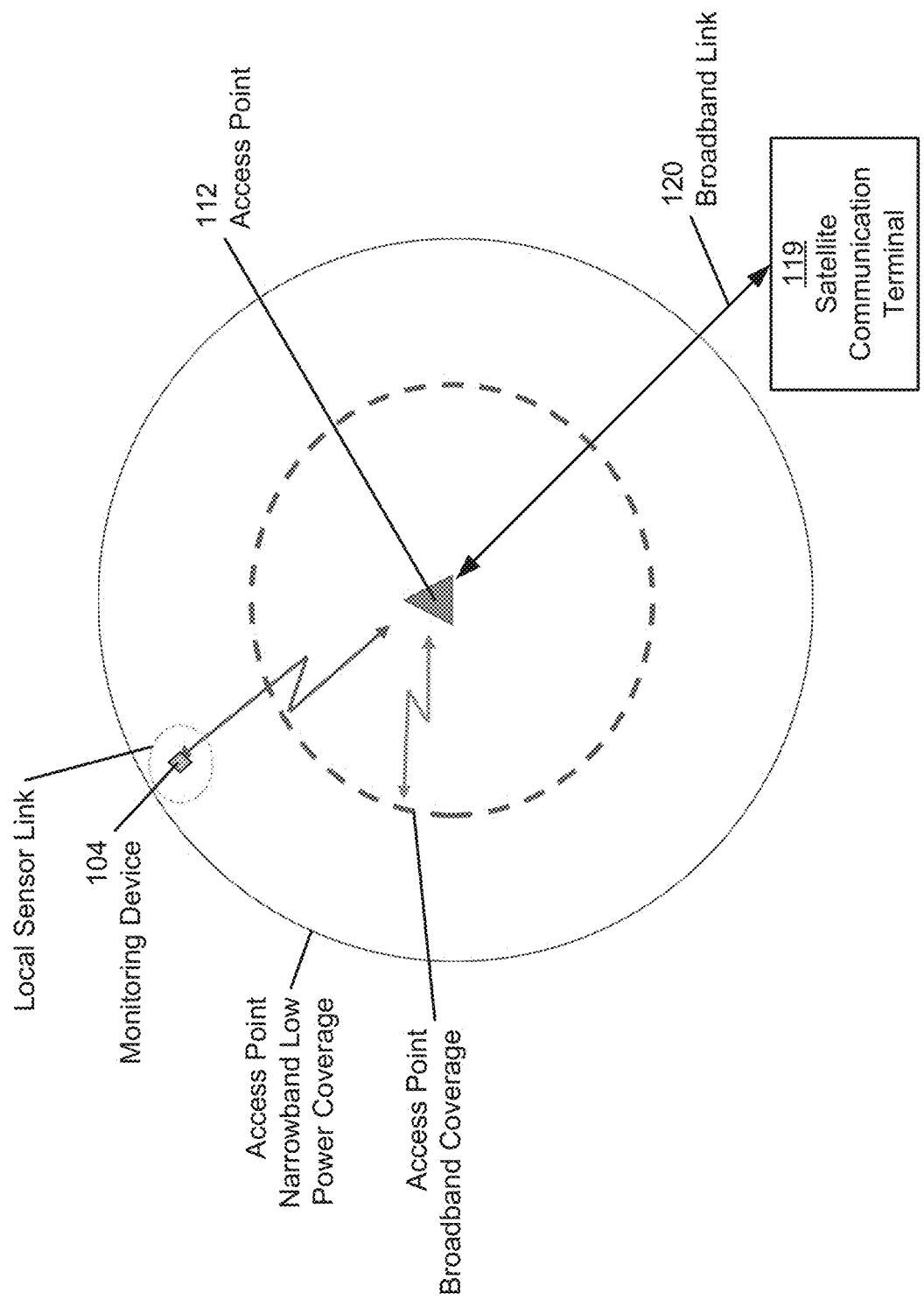

FIG. 1F shows an exemplary radio signal coverage of a satellite communication system comprising a satellite communication terminal 119 connected to a single access point 112 by a wired broadband link 120. A broadband coverage region of the access point 112, denoted by a dashed circle, surrounds the access point 112. Within the broadband coverage region, devices that require a broadband link 120 may be installed. A larger narrowband low power coverage region of the access point 112, denoted by the solid circle, surrounds the access point 112. While less data may be transmitted using an IoT link 106 (i.e., the local sensor link arrow), the IoT link 106 may require less power and may be feasible over longer distances, in comparison to a broadband link 120. For example, a battery-powered device (e.g. a monitoring device 104) may use the IoT link 106 rather than the broadband link 120 to conserve power. Those skilled in the art may appreciate that the areas that receive broadband and narrowband coverage depend on various factors, including the transmission power of the components involved in data transmissions, the types of antennas being used, terrain features, etc. Thus, in one or more embodiments, the local network within the field environment 100 may comprise only wired communication links or a mixture of wired and wireless communication links.

Figure 1G:
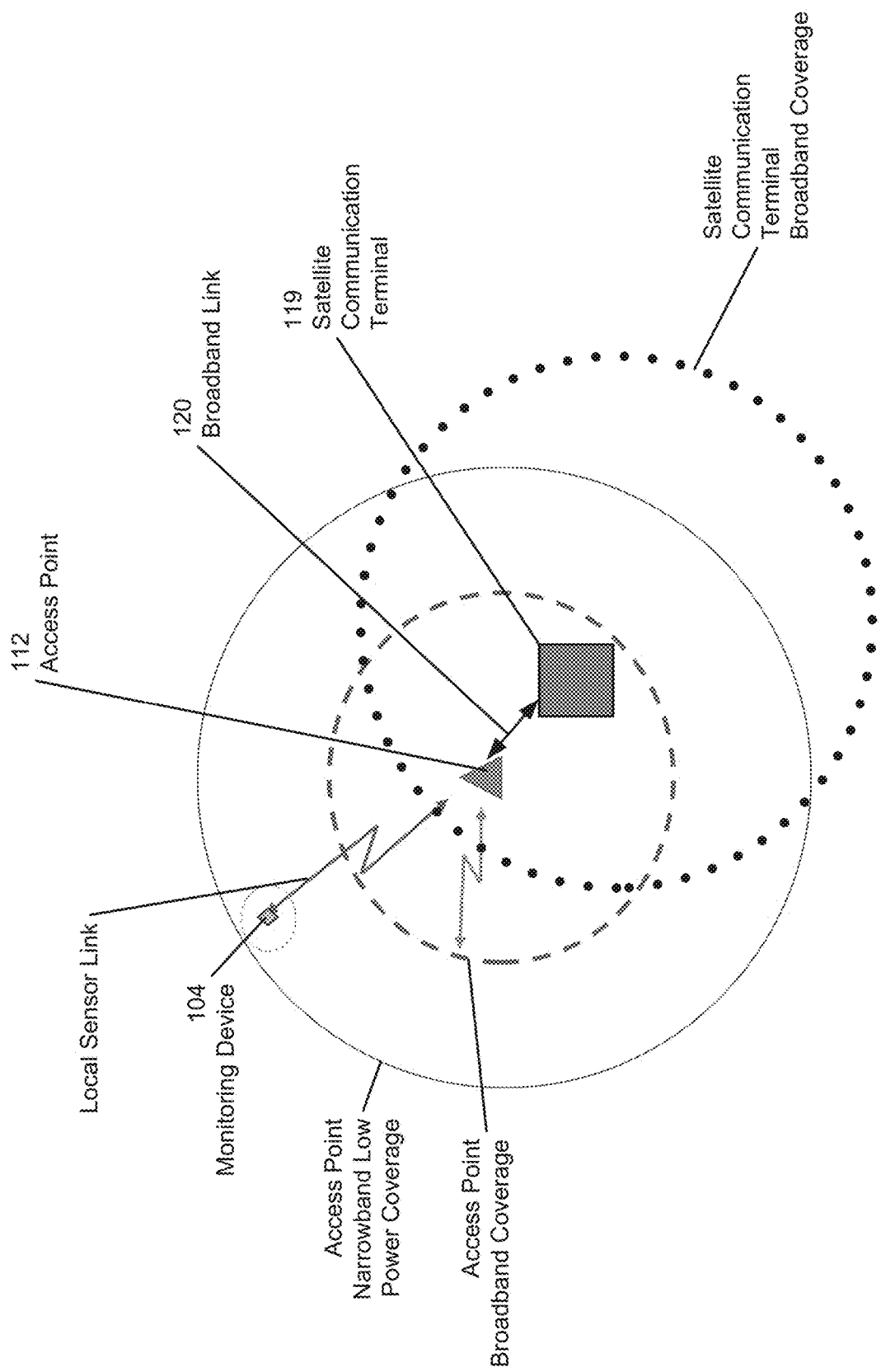

FIG. 1G shows an alternative radio signal coverage of a satellite communication system comprising a satellite communication terminal 119 connected to a single access point 112 by a wireless broadband link 120. A satellite communication terminal broadband coverage region, denoted by a dotted circle, surrounds the satellite communication terminal 119. Because the access point broadband coverage region and satellite communication terminal broadband coverage region overlap both devices, the access point 112 and satellite communication terminal 119 may support a wireless broadband link 120. Thus, in one or more embodiments, the local network within the field environment 100 may comprise only wireless communication links.

Figure 1H:
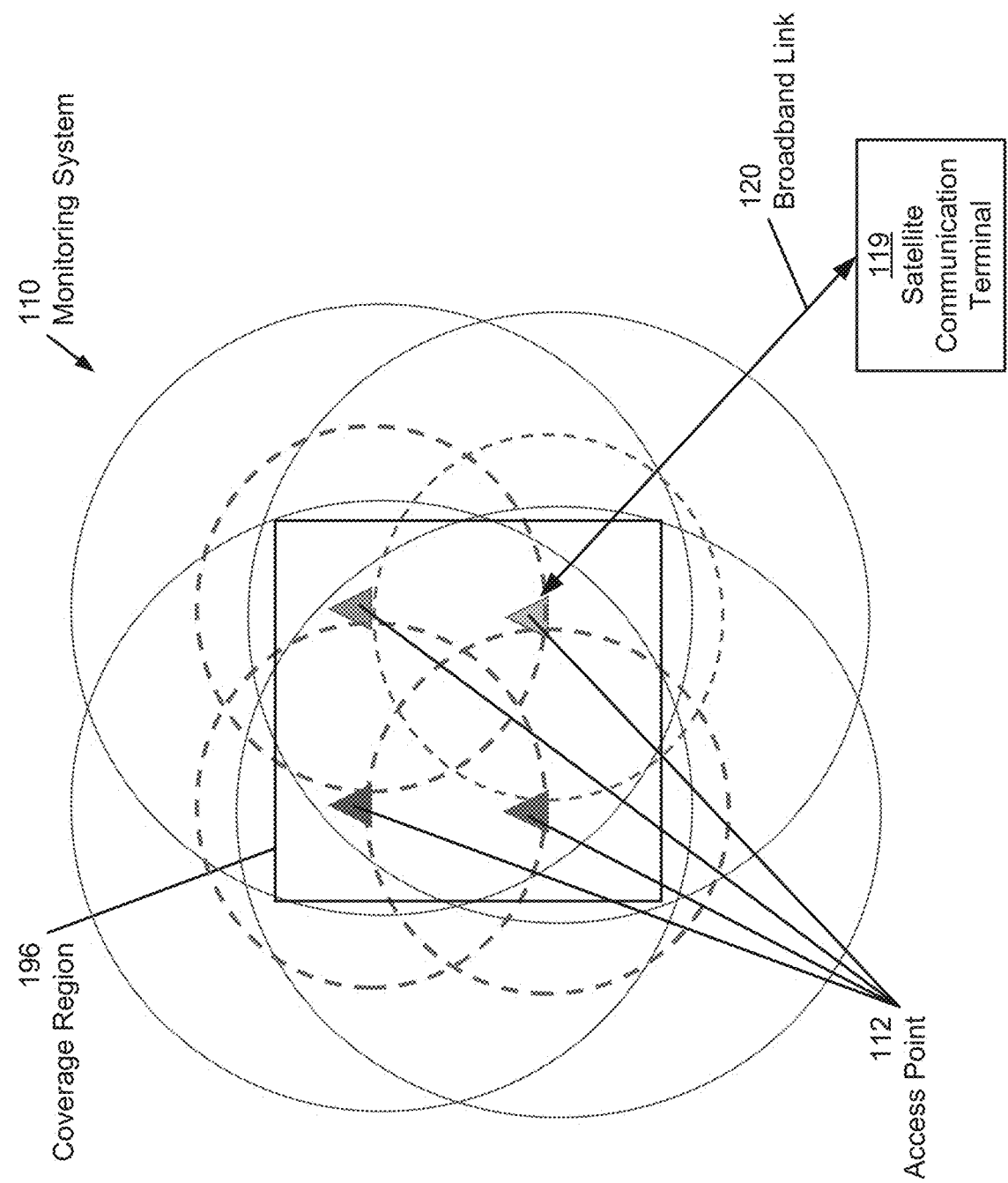

FIG. 1H shows an exemplary radio signal coverage of a satellite communication system comprising a satellite communication terminal 119 connected to a network of four access points 112. In the shown configuration, the access points 112 are spaced such that there is significant overlap between the broadband coverage (dashed circles) provided by the different access points 122, but also between the narrowband coverage (solid circles) provided by the different access points 122. Using the set of access points 122, a coverage region 196 is entirely covered by narrowband signals of at least three access points. In one or more embodiments, overlap of narrowband coverage provided by multiple access points 112 is desirable. Specifically, in a coverage region 196 where a device receives narrowband coverage by at least three narrowband signals (e.g., IoT signals), the signals of the device, received by at least three access points may be used to determine the location of the device, thus enabling, for example, location tracking of the device. The location of the device may be determined using time difference of arrival (TDOA) methods. Accordingly, location tracking using TDOA methods may be performed in the coverage region 196 in which at least three access points may receive transmissions sent by the device. TDOA positioning may provide moderately accurate location information (e.g. with an accuracy of approximately 30-75 m), although the accuracy may deteriorate when the quality of the reception at one or more of the access points 112 is poor. The measurement accuracy may, however, not be strongly affected by the presence of buildings and foliage. Alternatively, received signal strength indication (RSSI) positioning may provide location information with limited accuracy, (frequently no more accurate than approximately 75 m), and may allow positioning even under difficult conditions (e.g., when fewer than three access points are available). Further, if equipped with a global positioning system (GPS) receiver, the device's location may be determined using the GPS receiver. GPS positioning does not rely on the exchange of signals with access points 112 and may thus be available anywhere, even outside the coverage region 196, although power requirements may be significantly higher when relying on GPS. Further, GPS signals may be blocked by structures, foliage, etc. However, the accuracy is typically higher than the accuracy of the TDOA and RSSI methods.

Accordingly, to enable energy efficient location determination in certain regions, access points 112 may be strategically placed to have overlapping coverage regions, thereby not requiring the use of power consuming GPS positioning. In regions where TDOA based location services are desired, a dense grid of access points with a high degree of overlap may be installed to ensure that overlapping coverage is provided by at least three access points, whereas a sparse grid of access points may be installed in other regions. In these other regions, less accurate RSSI positioning may be used, or if an accurate location is required, GPS positioning may be used.

Figure 1I:
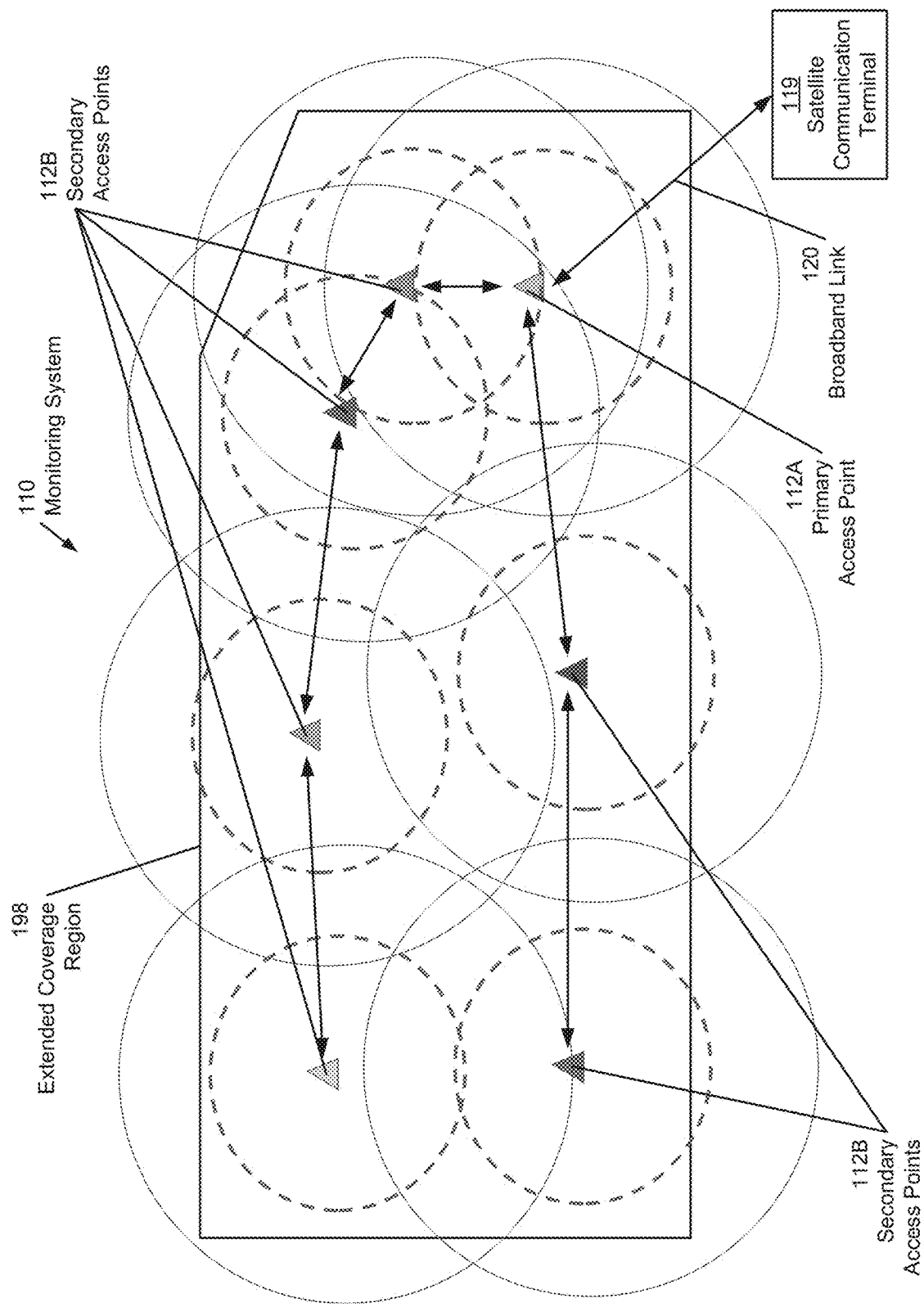

FIG. 1I shows an exemplary radio signal coverage of a satellite communication system comprising a satellite communication terminal 119 connected to a network of multiple daisy-chained access points 112A, 112B. To cover large areas effectively, access points may need to be deployed strategically to cover the field environment 100. The configuration shown in FIG. 1I uses a primary access point 112A that directly interfaces with the satellite communication terminal 119 and provides an interface to the secondary access points 112B. Using the daisy-chained set of access points 112A, 112B, a coverage region 198 is entirely covered by a narrowband signal (solid circles), while some areas are also covered by a broadband signal (dashed circles). In the exemplary configuration shown in FIG. 1I, the left part of the coverage region 198 is covered by sparsely placed access points and the broadband coverage regions are non-overlapping. In contrast, the right part of the coverage region 198 is covered by densely placed access points and the broadband coverage is overlapping, thus establishing a contiguous region with broadband signal coverage. Those areas may, thus, serve different purposes. For example, the left part may be used to monitor sensors that merely require a narrowband communication interface (e.g., weather sensors or monitoring devices for assets that do not require TDOA tracking). In contrast, the right part may be used for a drone surveillance that requires a continuous broadband signal. Those skilled in the art will appreciate that even though FIG. 1I shows the primary access point 112A interfacing directly with the satellite communication terminal 119, a hub 118 may be inserted as an intervening device to aid data processing and routing communications within the extended coverage region 198. Further, to provide coverage for even larger areas and/or for larger numbers of connected devices, additional access points 112 and/or additional hubs 118 may be deployed.

In one or more embodiments exemplified by FIG. 1J, the satellite communication system includes multiple network segments 192, 194. Each of the network segments 192, 194, is equipped with a satellite communication terminal 119 and multiple access points 112, providing broadband and/or narrowband network coverage. Both network segments may operate using the same communication protocols. Network segment A 192 is configured as a multitenant site (i.e., multiple customers are served by the network segment). Network segment B 194 is configured as a single tenant site.

Consider, for example, a satellite communication system installed at a remote oilfield facility that is occupied by multiple companies (e.g., an oil company and multiple oil and gas service companies). Assume that all of the companies require a satellite communication network to share data and information. Accordingly, the companies agree to have a common satellite communication system installed by a satellite service provider. Customer 1 is an oil company that owns the remote oilfield facility covered by network segment A and a headquarters covered by network segment B. Management staff of customer 1 are distributed across various sites of the remote oilfield facility but still need to communicate with each other and with headquarters. Customers 2-4 are different oil and gas service providers that operate different sites of the remote oilfield facility. Accordingly, network access between customers may be regulated and authorized by broadband services of the satellite communication terminal 119 to maintain confidentiality (e.g. firewalls) and track usage (e.g., monitor data caps) of and between the various customers. Broadband services are described below with respect to FIG. 2F.

The exemplary satellite communication system of FIG. 1J thus illustrates a multitenant, multisite satellite communication system, in accordance with one or more embodiments of the invention. Those skilled in the art will appreciate that satellite communication systems are fully scalable. For example, satellite communication systems may include any number of sites, any number of device, or any number of customers. Further, satellite communication systems, in accordance with one or more embodiments of the invention, may be globally distributed. For example, network segments A 192 and network segments B 194 may be on different continents. Network segments or sites may grow arbitrarily large, with any number of access points and/or devices. However, eventually a network segment or site with numerous devices may become congested, or the satellite communication terminal 119 of the network segment may be overwhelmed by the incoming volume of data. In such a scenario, the network segment may be split into two or more separate network segments, each with its own satellite communication terminal 119.

Figure 2A:
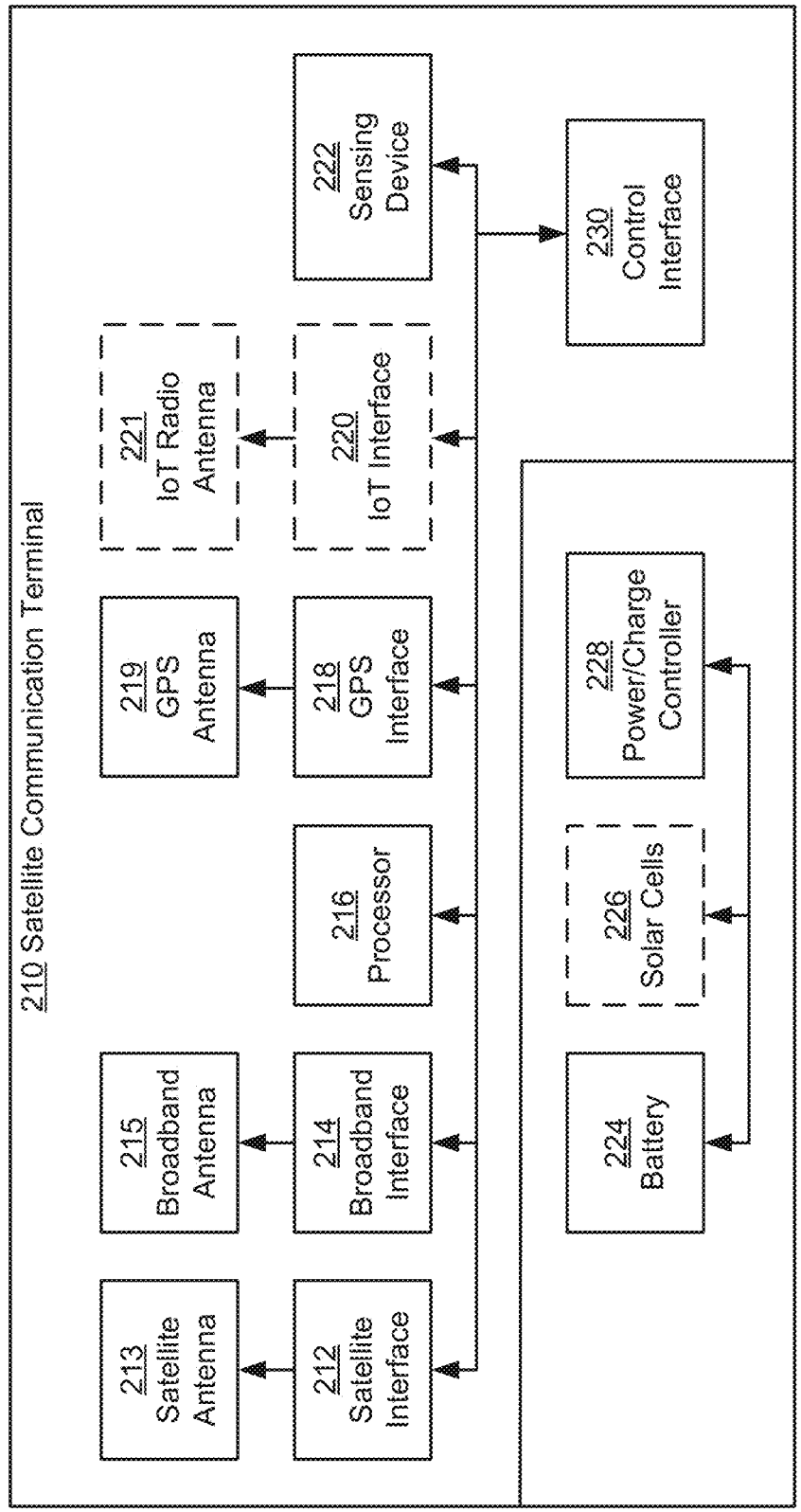
FIGS. 2A-2F show a satellite communication terminal, a satellite antenna, a satellite communication terminal-cloud configuration, and a processing platform, in accordance with one or more embodiments of the invention.

FIG. 2A shows a satellite communication terminal, in accordance with one or more embodiments of the invention. The satellite communication terminal 210 may be equipped with a mounting or attachment element that is application specific. For example, the satellite communication terminal 210 may be permanently or temporarily bolted to an equipment, installation, vehicle, or building in the field environment 100. Those skilled in the art will appreciate that the satellite communication terminal 210 is suitable for many applications and may thus be adapted to include mounting elements as needed. The satellite communication terminal 210 may further include several other components, each of which is described below, implemented using hardware, software, or a combination of hardware and software.

The satellite communication terminal 210 comprises a satellite interface 212 (i.e., modem) that manages communication over one or more satellite backhaul links 144. The satellite interface 212 may control a satellite antenna 213 in conjunction with a processor 216. Further, the satellite interface 212 may perform any necessary operations to filter, aggregate, compress, encrypt or otherwise process data that is sent or received (i.e., exchanged) over a satellite backhaul link 144. The satellite antenna 213 creates and maintains one or more satellite backhaul links 144 with one or more satellites 145. Various examples and embodiments of the satellite antenna 213 are described below with reference to FIGS. 2B-2D.

The satellite communication terminal 210 comprises a broadband interface 214 (i.e., modem) that manages communication over one or more broadband links 120 in the field environment 100. The broadband interface 214 may comprise one or more terminals to establish a wired broadband link 120 in the field environment 100. The broadband interface 214 may control one or more broadband antennas 215 in conjunction with a processor 216 to establish a wireless broadband link 120 in the field environment 100. Further, the broadband interface 214 may perform any necessary operations to filter, aggregate, compress, encrypt or otherwise process data that is sent or received (i.e., exchanged) over a broadband link 120.

The broadband interface 214 may support mesh, point-to-point, and multi-point connections. The broadband interface 214 may be based on a Wi-Fi standard (e.g., 802.11 interface) using one or more radio bands (e.g., the 2.4 and/or 5 GHz radio bands), IoT standard, or any other appropriate wireless communication interface without departing from the invention. Alternatively, the broadband interface 214 may be a 10/100/1000 Mbps ethernet interface, optical interface, or any other appropriate wired communication interface without departing from the invention.

The satellite communication terminal 210 comprises a processor 216 that may be part of a computing system that controls the satellite communication terminal 210, as described below with reference to FIG. 8. The processor 216, with associated memory and storage devices (not shown), controls the various components of the satellite communication terminal 210. For example, the processor 216 may control a beam direction of the satellite antenna 213, as described below with respect to FIGS. 2B-2D. Furthermore, the processor 216 may gather and process data from one or more of the sensing devices 222 to control a beam direction of the satellite antenna 213. The processor 216 may perform broadband services on data exchanged with a device in the field environment 100 over the broadband link 120 and the satellite backhaul link 144. Further, the processor 216 may provide access to the exchange data to the device (e.g., via a processing platform 270 described below with reference to FIG. 2F).

The satellite communication terminal 210 comprises a Global Positioning System (GPS) interface 218 that manages GPS information. The GPS interface 218 may control a GPS antenna 219 in conjunction with the processor 216. Further, the GPS interface 214 may perform any necessary operations to filter, aggregate, compress, encrypt or otherwise process data that is received by GPS antenna 219. In other words, the GPS antenna and GPS interface may provide location information of the satellite communication terminal 210 to the processor 216. The processor may use the location information to control the beam direction of the satellite antenna 213, as described below with respect to FIG. 7. When not in use, the GPS interface 218 may be in a deep sleep mode or completely powered down.

The satellite communication terminal 210 may optionally comprise an IoT interface 220 that manages communication over one or more IoT links 106 in the field environment 100. The IoT interface 220 may comprise one or more terminals to establish a wired IoT link 106 in the field environment 100. The IoT interface 220 may control an IoT radio antenna 221 in conjunction with the processor 216. Further, the IoT interface 220 may perform any necessary operations to filter, aggregate, compress, encrypt or otherwise process data that is sent or received (i.e., exchanged) over an IoT link 106. The IoT radio antenna 221 creates and maintains one or more wireless IoT links 106 with various IoT devices in the field environment 100.

The IoT interface 220 may be configured to communicate with one or more access points 112 or other devices (e.g., other sensors 122, a smartphone 128, or a laptop 130) in the field environment 100, using an IoT protocol such as LoRa. Communications may include, but are not limited to, the sending/receiving of a time base from one or more access points 112 or devices in the field environment 100, the receiving of a configuration, the receiving of a firmware, the sending/receiving of data, and/or the sending/receiving of device status data, such as errors, battery level, etc. The activity of the IoT interface 220 may be optimized to minimize power consumption. For example, the IoT interface 220 may be in a deep sleep mode whenever no transmission of data is required.

The satellite communication terminal 210 may comprise one or more sensing devices 222 that obtain various information about the satellite communication terminal 210 (e.g., position, orientation, internal temperature, ambient temperature, ambient pressure, altitude, humidity, etc.). These sensing devices 222 may include, but are not limited to a digital level, a magnetometer, an accelerometer, a thermometer, a barometer, an altimeter, a hygrometer, or any appropriate sensing device. The one or more sensing devices 222 may be used to determine the location of the satellite communication terminal 210 when other, more power efficient, methods for determining the location (e.g., GPS, TDOA, and/or RSSI) are not available or the previously acquired location data is not sufficiently accurate. The one or more sensing devices 222 may be interfaced with the processor 216 using digital and/or analog interfaces and may have a wired, wireless, optical, or any appropriate interface to the satellite communication terminal 210. When not in use, the sensing device 222 may be in a deep sleep mode or completely powered down.

In one or more embodiments, the components of the satellite communication terminal 210 are battery powered. The battery 224 may be a rechargeable or a non-rechargeable battery that may or may not be replaceable. The battery 224 may be selected to power the components of the satellite communication terminal for a specified duration, e.g., for multiple months or years. If the battery 224 is rechargeable, a power/charge controller 228 may control the charging of the battery 224 from optional solar cells 226 or other external power sources, such as inductively provided power. The power/charge controller 228 may further communicate battery status information to the processor 216. In addition, the battery level may directly govern the operation of the satellite communication terminal 210. For example, when a low battery level is detected, the communication frequency may be reduced, certain sensors may be deactivated, etc. In one or more embodiments, external power supplies (not shown) may be used if the satellite communication terminal 210 is stationary.

The satellite communication terminal 210 comprises a control interface 230 that may include analog or digital inputs/outputs, including communication bus systems, and/or relays, motors, or any other equipment that may be used to control functions of the satellite communication terminal 210. Those skilled in the art will appreciate that the control interface may be any appropriate interface used to control any function of the satellite communication terminal 210.

Figure 2B:
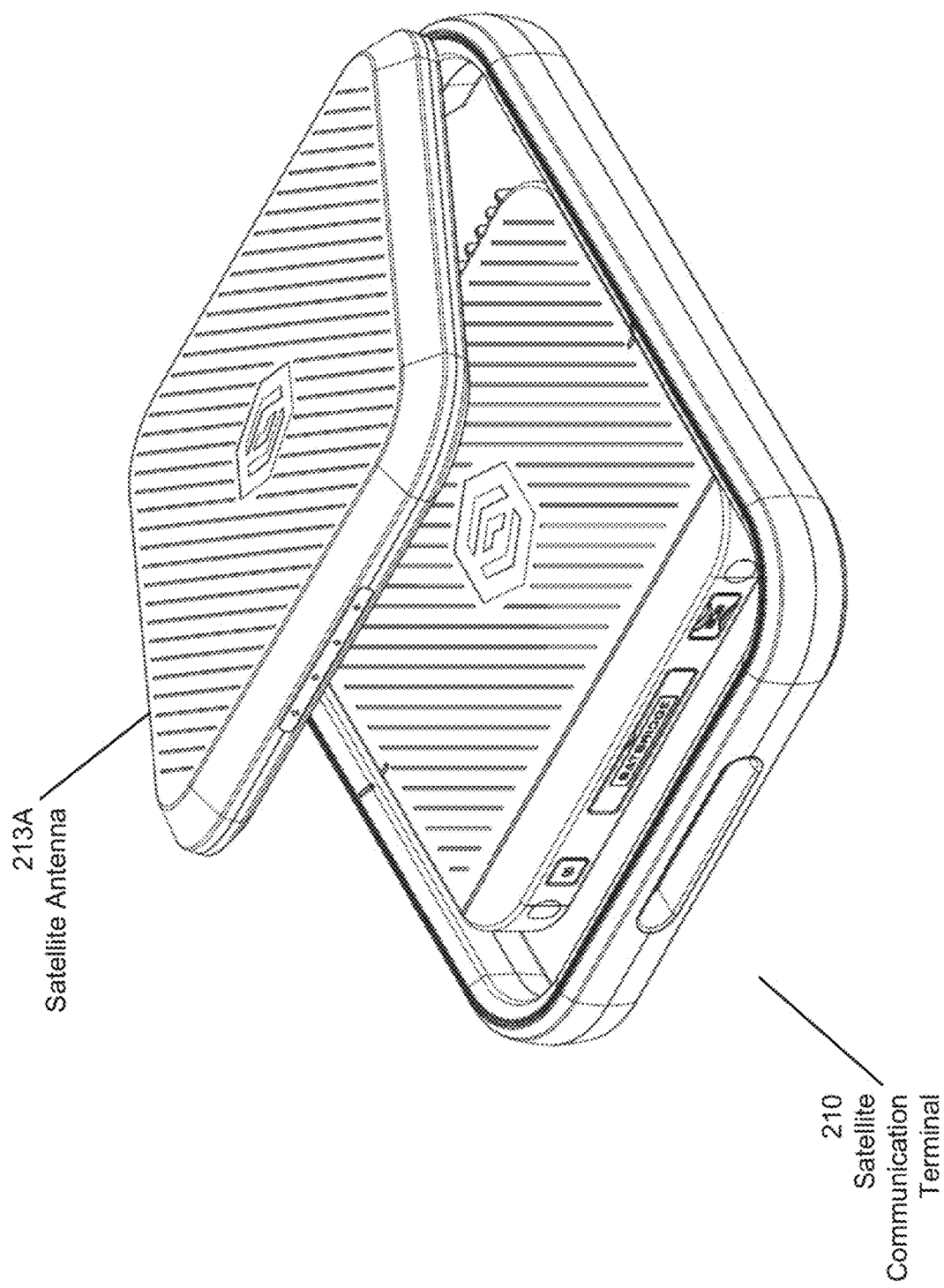

FIG. 2B shows a satellite communication terminal and satellite antenna, in accordance with one or more embodiments of the invention. The satellite antenna 213A may be a flat antenna that is oriented with respect to the satellite communication terminal 210 by a hinging connection on one edge. However, any appropriate hardware and electrical connection between the satellite communication terminal 210 and the satellite antenna 213 may be used. For example, the satellite antenna 213 may be detachable with an independent stand and cables to exchange signals and/or power with the satellite communication terminal 210.

In one or more embodiments, the satellite communication terminal 210 is configured for communications on the pause (COTP). In other words, the satellite communication terminal 210 comprises a satellite antenna 213 that maintains the satellite backhaul link 144 while the satellite communication terminal 210 is stationary (e.g., temporarily placed on a worksurface or permanently installed on a mounting surface). For example, a user may enter the field environment 100 and setup a stationary workstation with a satellite communication terminal 210.

In one or more embodiments of a COTP satellite communication terminal 210, the satellite antenna 213A is a flat antenna with a relatively fixed beam direction. The beam direction of the satellite antenna 213 may be defined as a direction of highest signal intensity, but is not limited to this definition. For example, the beam direction may be an angular range with a minimum acceptable signal level (e.g., +/−20 degree working range). In one or more embodiments, the beam direction of the satellite antenna 213A may be fixed by a radiation pattern inherent to the physical components of the antenna (e.g., size, distribution, or phase offset of one or more antenna elements 213B).

In one or more embodiments, the satellite communication terminal 210 may connect with a satellite 145 in a geostationary orbit. By rotating the satellite communication terminal 210 and adjusting the orientation of the satellite antenna 213A, the beam direction of the satellite antenna 213A may be manually steered within a predetermined angular range of the geostationary satellite 145. In this case, the satellite backhaul link 144 can be established and maintained without further interaction until the user moves the satellite communication terminal 210.

Figure 2C:
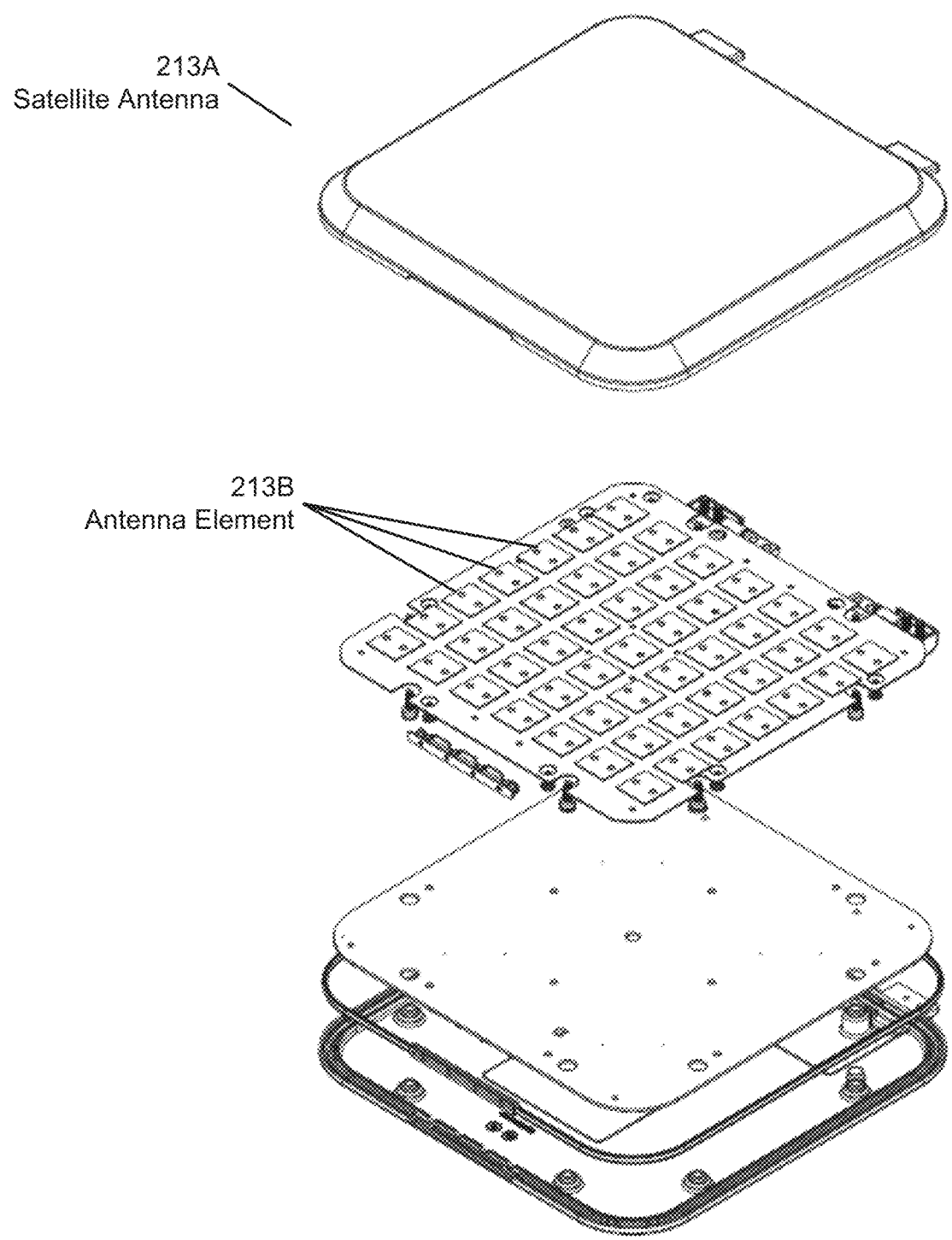

FIG. 2C shows an exploded view of a satellite antenna, in accordance with one or more embodiments of the invention. The satellite communication terminal 210 may include a flat satellite antenna 213A with a plurality of antenna elements 213B. In one or more embodiments, the antenna elements 213B may be disposed in a regular array (e.g., a rectilinear array), but the configuration of antenna elements 213B is not limited to any particular regular or irregular pattern. Furthermore, the antenna elements 213B may be grouped or independently controlled to achieve any appropriate radiation profile, as discussed below.

In one or more embodiments, the satellite communication terminal 210 is configured for communications on the move (COTM). In other words, the satellite communication terminal 210 comprises an antenna 213 that maintains the satellite backhaul link 144 while the satellite communication terminal 210 is in motion. For example, a user travelling across the field environment 100 may setup a mobile workstation (e.g., in a car, boat, or airplane) with a satellite communication terminal 210.

In one or more embodiments of a COTM satellite communication terminal 210, the satellite antenna 213A is a flat antenna comprising a plurality of antenna elements 213B that function as a phased antenna array. The beam direction of the satellite antenna 213A may be varied by manipulating the collective radiation profile of the plurality of antenna elements 213B (i.e., beam-forming). After aligning the beam direction by the beam-forming, the satellite communication terminal 210 may establish a satellite backhaul link 144 with a satellite 145 in a geostationary orbit. The satellite communication terminal 210 maintains the satellite backhaul link 144 by redirecting the beam direction to track the stationary satellite 145 in the sky as the satellite communication terminal 210 moves around the field environment 100.

Alternatively, the satellite communication terminal 210 may establish a satellite backhaul link 144 with a satellite 145 in a non-geostationary orbit. The satellite communication terminal 210 maintains the satellite backhaul link 144 by redirecting the beam direction with beam-forming to track the moving satellite 145 in the sky as the satellite communication terminal 210 moves around the field environment 100. Those skilled in the art will appreciate that a beam-forming satellite antenna 213A may be used for both COTP and COTM applications in conjunction with a geostationary or non-geostationary satellite 145.

Figure 2D:
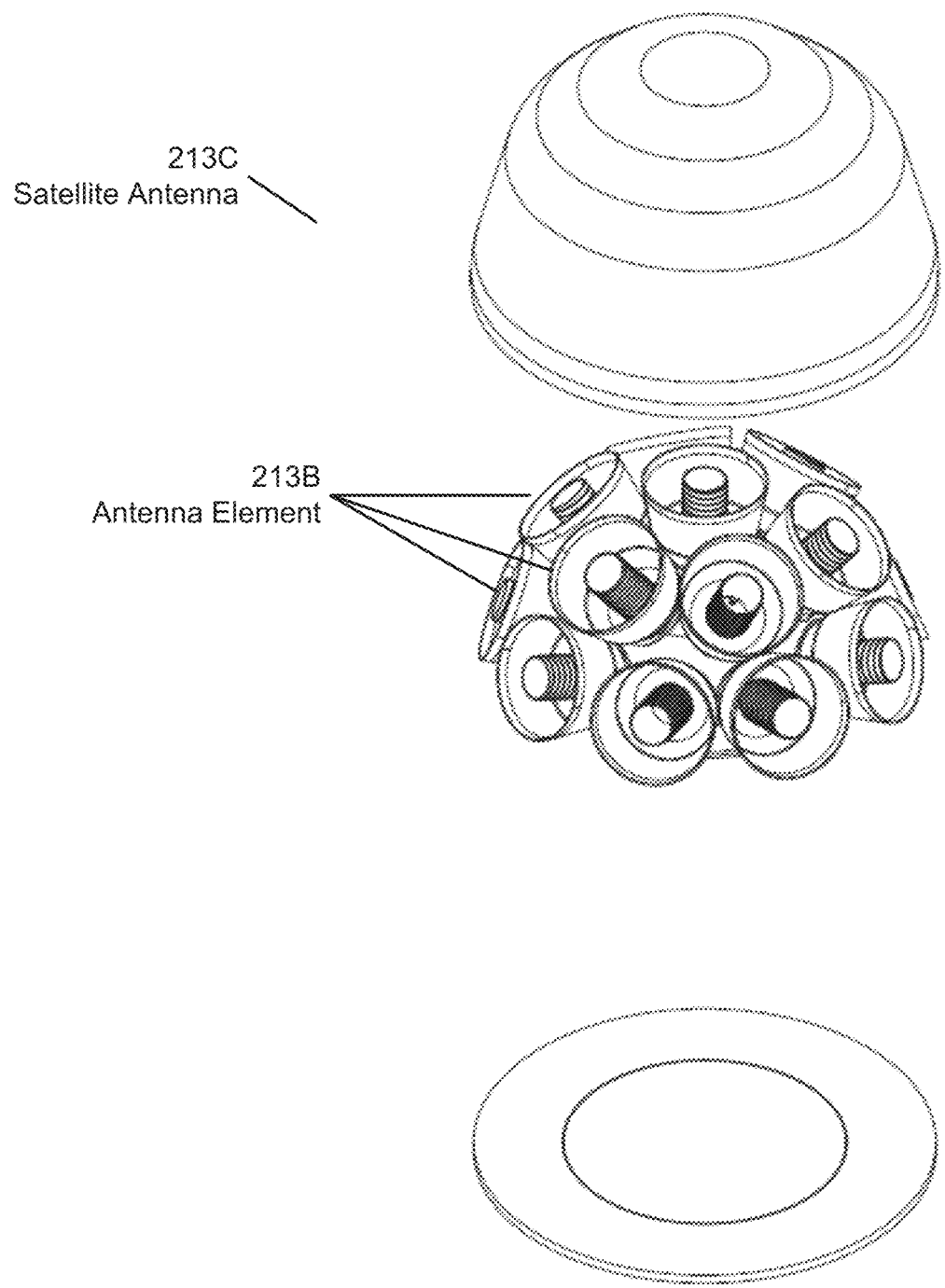

FIG. 2D shows an exploded view of a satellite antenna, in accordance with one or more embodiments of the invention. The satellite communication terminal 210 may include a satellite antenna 213C with a plurality of antenna elements 213B oriented in different directions. In one or more embodiments, the satellite antenna 213C may comprise a base and a cover to protect the antenna elements 213B from hostile conditions (e.g., broad temperature ranges, wind, rain, dust, insects and mechanical stress).

In one or more embodiments, the satellite antenna 213C may be used for both COTP and COTM applications in conjunction with a geostationary or non-geostationary satellite 145. The satellite interface 212 of the satellite communication terminal 210 may automatically select one or more antenna elements 213B of the plurality of antenna elements 213B that are optimally aligned with the target geostationary or non-geostationary satellite 145. Furthermore, the satellite antenna 213C requires minimal setup because the plurality of antenna elements 213B may be distributed to provide relatively uniform coverage in a wide range of directions, regardless of the orientation of the satellite communication terminal 210.

Figure 2E:
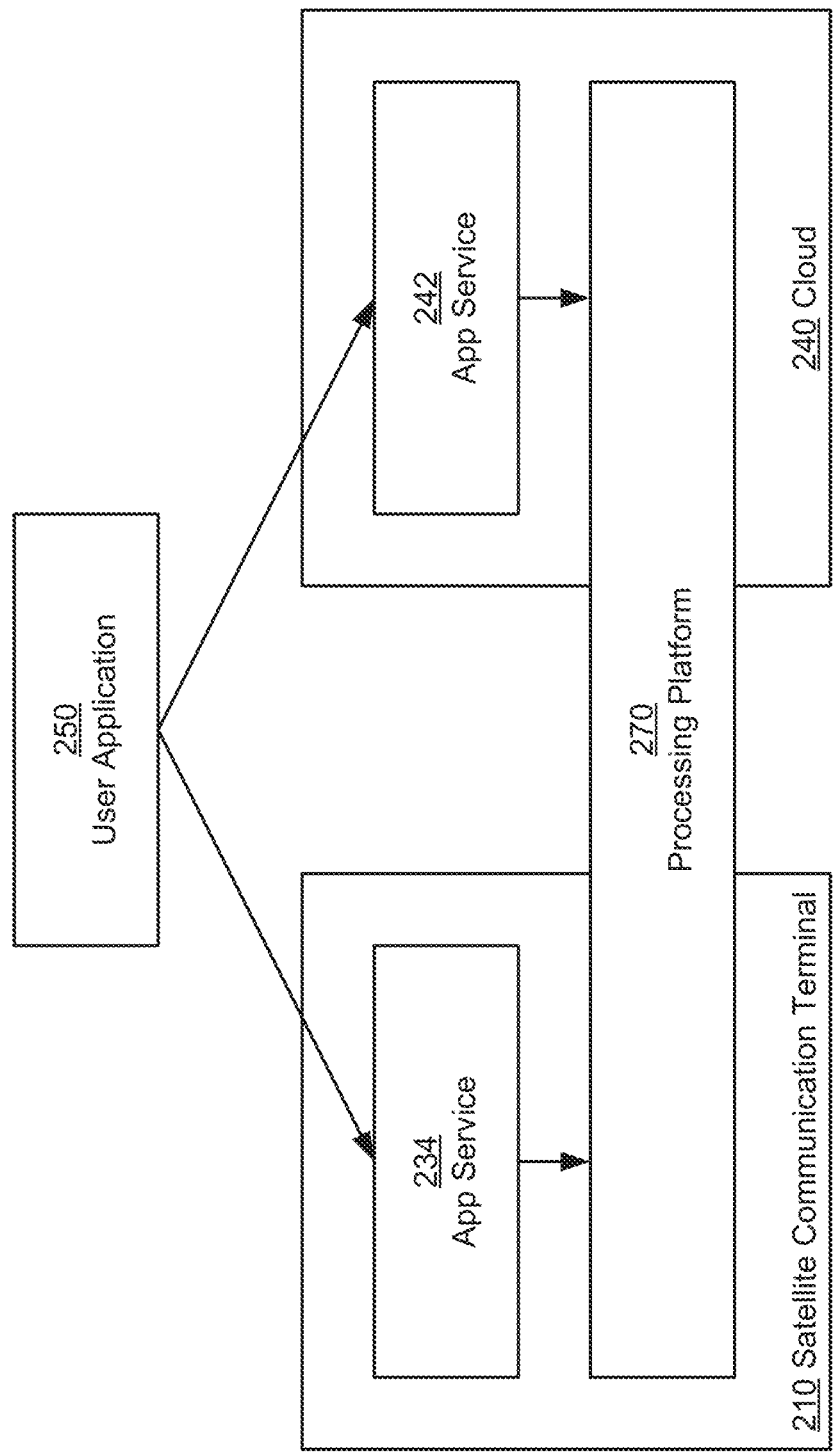

FIG. 2E shows a satellite communication terminal-cloud configuration, in accordance with one or more embodiments of the invention. The satellite communication terminal-cloud configuration includes the satellite communication terminal 210, the cloud 240, and the user application 250. A processing platform 270, jointly executing on the satellite communication terminal 270 and in the cloud 240 in a distributed manner, provides back end-support for the various devices in the field environment 100, as further described with reference to FIG. 2F. A user application 250 may be relied upon by a user to access the processing platform 270 via the satellite communication terminal 210 and/or via the cloud 240. Each of these components is subsequently described.

In one or more embodiments, services available through the processing platform 270 may include providing/exchanging data between devices in the field environment 100 or enabling the user to interact with the devices in the field environment 100, etc. The processing platform 270 may be accessed by a user using the user application 250, which may be executed on a computing device such as a smartphone 128 or a laptop 130. The user application 250 may provide a user interface that enables the user to access the processing platform 270. The user application 250 may include alert displays, status messages, data visualization capabilities, control and configuration capabilities (e.g., satellite antenna positioning and orientation instructions described below with respect to FIG. 7), but is not limited these functionalities. The user application 250 may further provide data entry fields to configure the services performed by the processing platform 270 (e.g., setting authorization parameters, validating authorization, etc.), specialized control interfaces (e.g., to control a drone 117), voice over IP (VoIP) and/or push to talk interfaces and other communication interfaces that are supported by the broadband links 120 provided by the access points 112. Alternative implementations of the user application 250 may operate on other devices in the field environment (e.g., on an audio alert device, a laptop 130, or a monitored device 104).

Depending on whether the user application 250 accesses the processing platform 270 via the satellite communication terminal 210 (i.e., part of a local network in the field environment 100) or via the cloud 240 (i.e., part of an external network connected to the cloud 240) the user application 250 may interface with the processing platform via the app service 234 of the satellite communication terminal 210 or via the app service 232 of the cloud 240. When a user is located in the field environment (e.g., directly connected to an access point 112 or the satellite communication terminal 210), accessing the processing platform 270 may be particularly low-latency because the interaction of the user's device with the satellite communication terminal 210 is local.

The satellite communication terminal 210 includes a computing device configured to execute the app service 234 to interface with one or more access points 112, the cloud 240, and the device that executes the user application 250. In one or more embodiments, the computing device of the satellite communication terminal 210 may be an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), one or more wired or wireless network interfaces (e.g., an Ethernet interface, an optical interface, a Wi-Fi interface, a Bluetooth interface, a cellular interface, etc.), and interfaces to storage devices, input and output devices, etc. The computing device of the satellite communication terminal 210 may further include one or more storage device(s) (e.g., a hard disk, an optical drive such as a compact disk (CD) drive or digital versatile disk (DVD) drive, flash memory, etc.), and numerous other elements and functionalities. In one or more embodiments, the computing device includes an operating system that may include functionality to execute the methods further described below. Those skilled in the art will appreciate that the invention is not limited to the aforementioned configuration of the computing device of satellite communication terminal 210.

The cloud 240, in accordance with one or more embodiments of the invention, may be formed by multiple/many networked computing devices. These computing devices may be geographically and organizationally distributed in any way. For example, some of these computing devices may be located in a data center, whereas other such computing devices may be individual physical or virtual servers. An exemplary computing system, as it may be used in the cloud 240, is shown in FIG. 8. One or more of the computing devices may host the processing platform 270, analogous to how the processing platform 270 is hosted on the satellite communication terminal 210. While the components of the processing platform 270 that are executing on the satellite communication terminal 210 and that are executing on a computing device in the cloud 240 may operate separately, they are interconnected via the satellite backhaul link 144, thus enabling synchronization between these components. Accordingly, the same information may be available, regardless of whether the user application 250 connects via the satellite communication terminal 210 or via the cloud 240. Temporary discrepancies may exist though, e.g., during times when the satellite backhaul link 144 is interrupted, and a synchronization is therefore unavailable. Further, because additional data processing may be performed in the cloud 240, additional data, resulting from the additional processing, may be available when connecting to the processing platform 270 via the cloud 240. Such data may, however, also be available via the satellite communication terminal 210, if synchronization via the satellite backhaul link 144 is maintained. The cloud 240 may run multiple instances of the processing platform 270 in order to support the load of many devices and/or many users. Depending on the configuration of the processing platform 270, incoming data (i.e., data received from a particular access point 112, a particular device, a particular site, or a particular customer) may be distributed between multiple instances, or may be consistently assigned to the same instance (e.g., by using a consistent hash ring configuration).

Those skilled in the art will recognize that other configurations that deviate from the configuration introduced in FIG. 2E may exist, without departing from the invention.

In one or more embodiments, a field environment 100 can only intermittently establish the satellite backhaul link 144 to the satellite 145. Therefore, the processing platform 270 may solely execute on the satellite communication terminal 210. In such a scenario, the satellite communication terminal 210 may be configured to temporarily "self-backhaul" (i.e., the satellite communication terminal 210 may collect and consolidate data and may perform some or even all of the processing that would otherwise be performed in the cloud).

In one or more embodiments, the satellite communication terminal 210 may partially or completely share one or more instances of the processing platform 270 with a hub 118, an access point 112, or a device in the field environment (e.g., a laptop 130).

All processing functionality, even functionally that would typically be provided by the satellite communication terminal 210, may be provided in the cloud 240. The configuration of the satellite communication system, with or without a hub 118, with or without access points 112, may be transparent (i.e., devices in the field environment 100 may operate in the same manner, regardless of the presence of a hub 118, access point 112, or reliable satellite backhaul link 114). Similarly, a user may experience the same satellite communication system, whether or not a hub 118, access point 112, or reliable satellite backhaul link 114 is present.

Figure 2F:
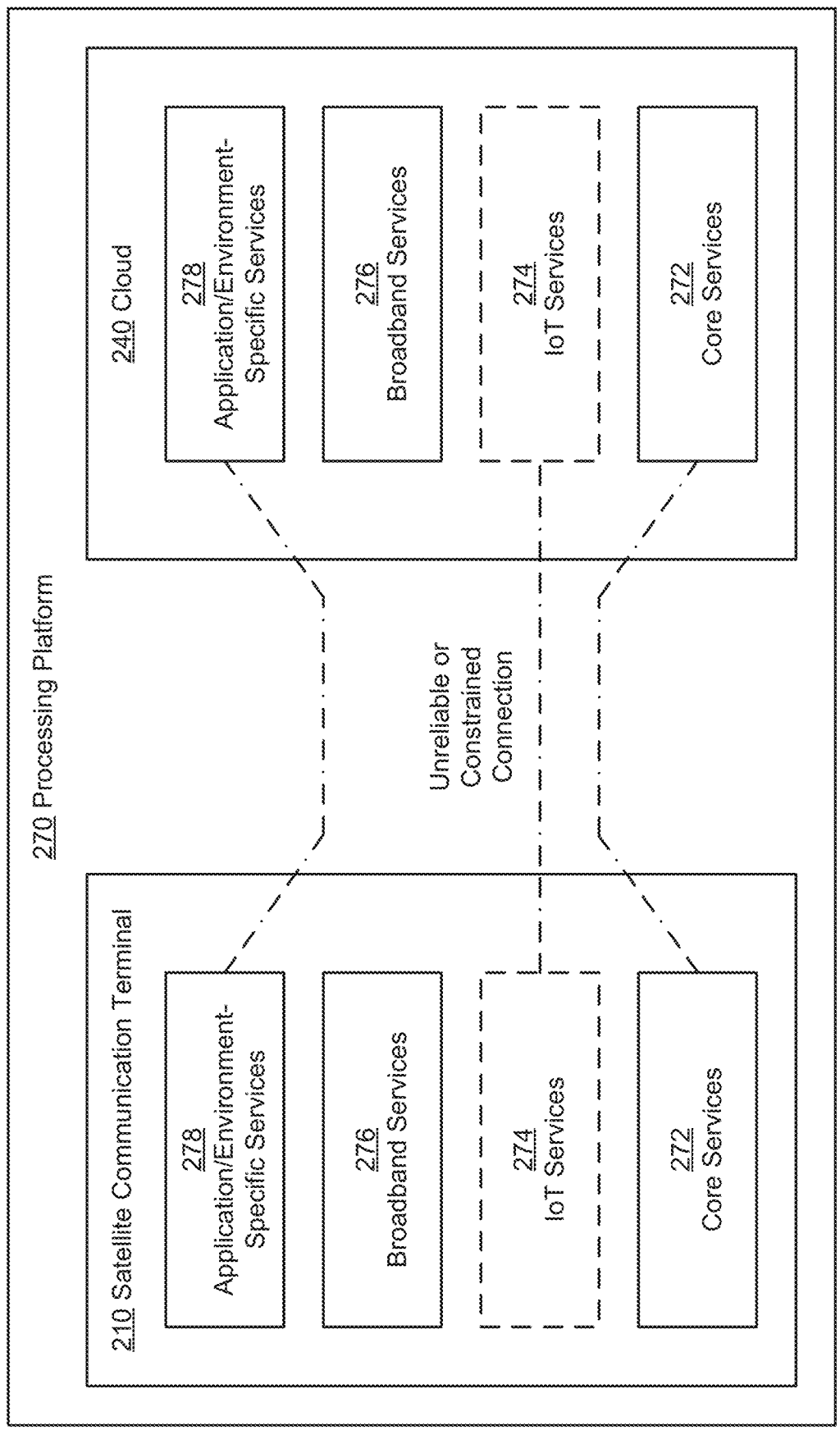

FIG. 2F shows a processing platform, in accordance with one or more embodiments of the invention. In one or more embodiments, the processing platform 270 is organized in layers. Those skilled in the art will appreciate that, any organization of services or operations executed by the processing platform may be used and that the invention is not limited to the following configuration. Further any services described herein may be shared or distributed among one or more layers.

Core services 272 provide basic functionalities such as data storage, networking, and messaging.

Above the core services 272, the optional IoT services 274 provide services specific to IoT networks, but that are not necessarily required in all applications. The IoT services 274 may include location services (e.g., GPS, TDOA or RSSI based), IoT network services, and configurations, etc.

Above the IoT services 274, the broadband services 276 provide services to manage broadband communication between a device in the field environment 100 (e.g., a monitoring device 104, an access point 112, a smartphone 128, or a laptop 130) and the connected network.

In one or more embodiments, broadband services 276 may include routing, switching, or authorizing the exchange of data. For example, broadband services 276 may comprise managing an authorization of the device or a user of the device to communicate within a local network connected to the satellite communication terminal 210 or an external network connected to the satellite 145. Authorization may be based upon credentials of the device or credentials of the user. Furthermore, authorization may control the ability of the device/user to exchange data with other devices/users in the local network or the external network.

In one or more embodiments exemplified in FIG. 1J, a satellite communication terminal 119 may support a local network utilized by multiple customers (e.g., Customers 1-4 in Network Site A 192). The satellite communication terminal 119 may authorize communication (e.g., access to data or exchange of data) between multiple devices owned by a single customer (e.g., Customer 1), but may prevent communication between different customers (e.g., limit or entirely stop communication between Customer 1 and Customers 2-4). Alternatively, authorization to communicate between different customers in Network Site A 192 may be granted if the different customers establish a mutual agreement with an owner/operator of the satellite communication terminal 119.

In one or more embodiments exemplified in FIG. 1J, the satellite communication terminal 119 in Network Site A 192 may be linked with an external network in Network Site B 194 (e.g., a remote site that may be accessed via the satellite 145 and the satellite backhaul link 144). Network Site B 194 may be exclusively utilized by Customer 1 from Network Site A 192. Accordingly, the satellite communication terminal 119 in Network Site A 192 and/or Network Site B 194 may be configured to authorize communication between all devices owned/operated by Customer 1 in both the local network (Network Site A 192) and the external network (Network Site B 194).

In one or more embodiments, the satellite communication terminal 210 may independently authorize the device/user to communicate with the cloud 240 or an external network such as the world wide web.

In one or more embodiments, the authorization may comprise a level of service within the local network connected to the satellite communication terminal or the external network connected to the satellite. For example, the level of service may define one or more formats of data (e.g., text data, voice data, video data) that the device/user is authorized to utilize. Furthermore, the level of service may define one or more bandwidths allocated to the device/user (e.g., bandwidth limits, data caps). An allocated bandwidth may apply to all communication by the device/user; communication by the device/user within a specific network (e.g., the local network, the external network, or some combination of networks); communication within a predetermined time period, or any other appropriate metric to manage broadband communication facilitated by the satellite communication terminal 210. Further still, the level of service may define the type of network connections the device/user is allowed to use for connecting with a network (e.g., wireless link, wired link, broadband link, IoT link, or a combination of links).

In one or more embodiments, the authorization configuration implemented by the broadband services 276 in the satellite communication terminal 210 may be mirrored in the cloud 240, other satellite communication terminals 210, a hub 118, or any other computing device.

Furthermore, broadband services 276 may further include general data services such as aggregating, filtering, fusing, compressing, encrypting data, and the like.

The topmost layer includes application/environment-specific services 272. In one or more embodiments directed to a field environment in healthcare facility, the application/environment-specific services 272 may include analysis of patient vital signs, a patient location tracking interface, etc. In one or more embodiments directed to a field environment in oilfield facility, the application/environment-specific services 272 may include pipeline operation analytics, equipment command/control interfaces, sensor monitoring/analysis, etc. Other application/environment-specific layers may be added, replaced, or removed without departing from the invention.

The processing platform 270 is modular, allowing adaptation to many applications, depending on the services required by the field environment 100.

In one or more embodiments, the services of the processing platform 270 may be available through the satellite communication terminal 210 and/or through the cloud 240. A synchronization may be performed between the services executing in the cloud 240 and the services executing on the satellite communication terminal 210, thus maintaining consistency between the satellite communication terminal 210 and the cloud 240. As long as a satellite backhaul link 144 is available, the data available through the satellite communication terminal 210 and through the cloud 340 may be identical.

However, if the satellite backhaul link 144 becomes temporarily unavailable because of an unreliable or constrained data connection, data that is accumulated (i.e., buffered) on the satellite communication terminal 210 may not be available through the cloud 240, and vice versa. A synchronization may be performed once the satellite backhaul link 144 is restored, to update the cloud 240 and the satellite communication terminal 210. Accordingly, consistent information (e.g., data, network configuration, or authorization information) is available via satellite communication terminal 210 and cloud 240.

Figure 3B:
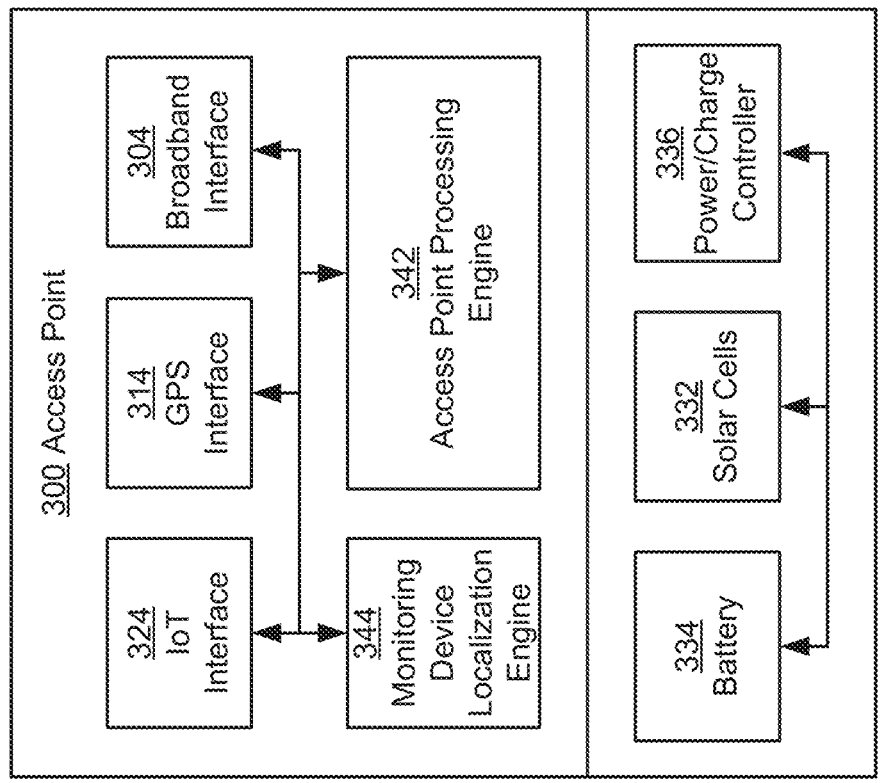
Figure 3A:
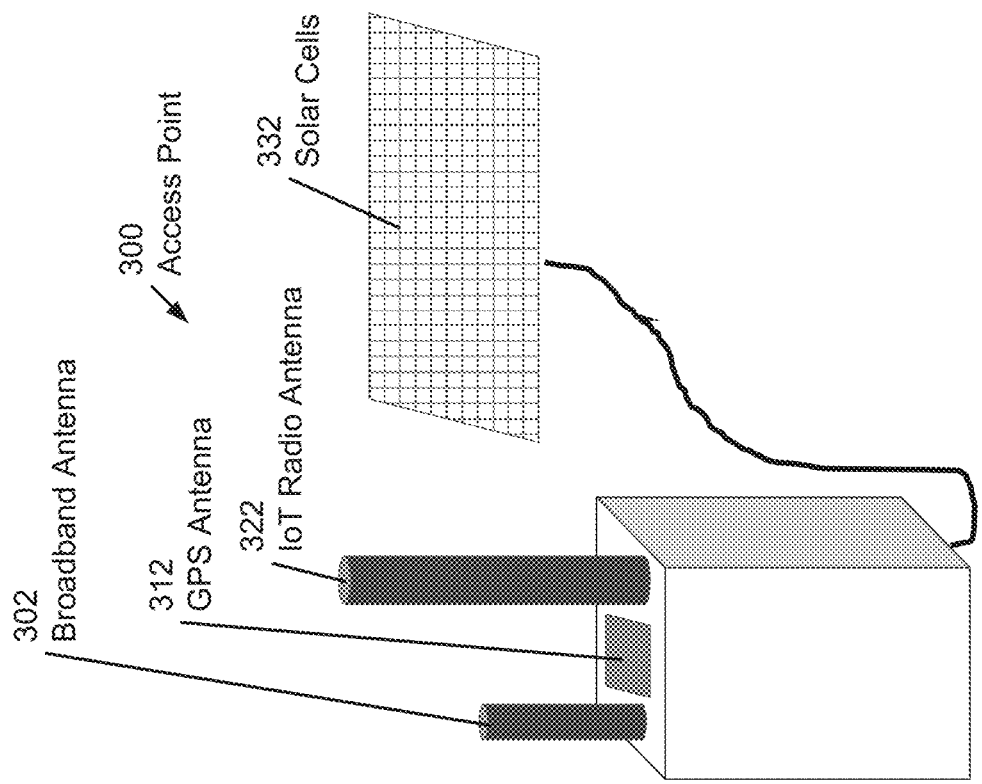

FIGS. 3A-3G show access points of a satellite communication system, in accordance with one or more embodiments of the invention. In FIG. 3A, the general design of an access point 300 is shown, and in FIG. 3B, the architecture of the access point 300 is illustrated. The access point 300 shown in FIG. 3A includes a broadband antenna 302, a GPS antenna 312, an IoT radio antenna 322 and solar cells 332. As shown in FIG. 3B, the access point 300 further includes a broadband interface 304, a GPS interface 314 and an IoT interface 324.

The broadband interface 304 uses the broadband antenna 302 in order to send and receive broadband data transmissions when in contact with other access points 112, as illustrated in FIG. 1C and/or with other devices such as smartphones 128, laptops 130, cameras 122 and/or drones 117 that are also equipped with broadband interfaces. The broadband interface 304 may support mesh, point-to-point and multi-point connections. As discussed above, with respect to the broadband interface 214 of the satellite communication terminal 210, the broadband interface 304 of the access point 300 may be any wired or wireless communication interface.

The GPS interface 314 uses the GPS antenna 312 to obtain position signals from the global positioning system or from alternative satellite navigation services. The position signal enables the access point 300 to accurately determine its own position. In one or more embodiments, the GPS interface 314 further obtains an accurate time base that may be used by the access point 300 to perform localization tasks using TDOA methods, as further described below.

The IoT interface 324 uses a wired connection (not shown) or the IoT radio antenna 322 to communicate with one or more IoT devices such as the monitoring devices 104. The IoT interface 324 may be based on a low power wide area network standard such as, for example, LoRa. The resulting narrowband link is particularly suitable for communications between the access point 300 and the monitoring devices 104 or other sensors 122, due to its low power requirements, long range, and its ability to interface with many monitoring devices 104 and/or other devices. In one or more embodiments, the IoT interface 324 supports communication protocol extensions implemented on top of an existing IoT communication protocol to provide scheduled communications and timing beacons as further discussed below, with reference to FIG. 6.

In one or more embodiments, the access point 300 further includes an access point processing engine 342. The access point processing engine 324 may handle the processing of data received from monitoring devices 104 and other sensors 122, and may coordinate the uploading of the processed data to either a hub 118 or a satellite communication terminal 119. As discussed above, with respect to the broadband services 278 of the processing platform 270, the processing of data may involve, for example, data aggregation, data filtering, data fusion, data compression, and/or data encryption.

Figure 6:
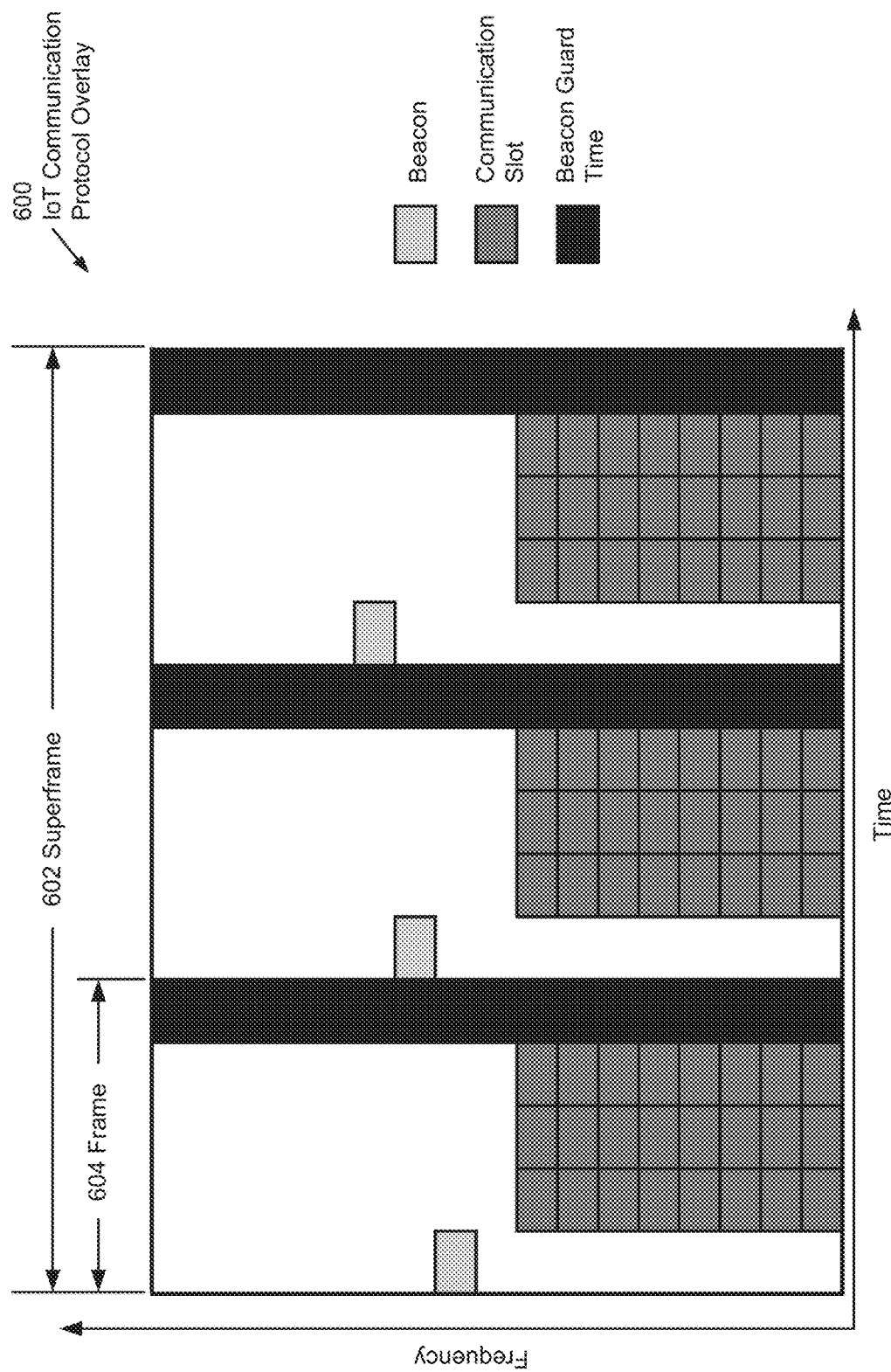
FIG. 6 shows an Internet of Things (IoT) communication protocol overlay, in accordance with one or more embodiments of the invention.

In one or more embodiments, the access point 300 further includes a device localization engine 344. The device localization engine 344 may be used to determine the locations of devices (e.g., monitoring device 104, smartphone 128, etc.) that are within the coverage region of the access point 300. The localization may be performed, for example, using TDOA methods. Using the TDOA method, triangulation, based on the differences in time delay of a data transmission by a device, received by at least three access points 300, may be performed. The device localization engine 344 of an access point 300 may use this time delay information to determine the location of the device responsible for the data transmission. Because TDOA methods depend on the availability of an accurate time base to the devices whose location is to be determined, communication protocol extensions that enable dissemination of an accurate time base to the devices via the IoT link, as discussed with reference to FIG. 6, are used by the access point 300. Alternatively, the device localization engine 344 may extract the location of the device from a message provided by a GPS unit equipped on the device. Further, the device localization engine 344 may also determine a location of the device based on the signal strength of a data transmission obtained from the device, using the RSSI method. Those skilled in the art will appreciate that, any device that is equipped with an IoT interface 324, and that communicates with the access point 300, may be localized by the device localization engine 344.

The access point processing engine 342 and the monitoring device localization engine 344 may be software, hardware, or any combination of software and hardware implemented by a computing device (not shown) of the access point 300. The computing device of a hub 318 may be, for example, an embedded system in the access point 300 that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), and interfaces to storage devices, input and output devices, etc. The computing device may further include one or more storage device(s) (e.g., a hard disk, an optical drive such as a compact disk (CD) drive or digital versatile disk (DVD) drive, flash memory, etc.), and numerous other elements and functionalities. In one embodiment of the invention, the computing device includes an operating system that may include functionality to execute the methods further described below. Those skilled in the art will appreciate that the invention is not limited to the aforementioned configuration of the computing device.

In one or more embodiments of the invention, the access point 300 further includes a power system that may include the solar cells 332, a battery 334 and a power/charge controller 336, that powers the access point. The battery 334 may be deep-cycle capable to guarantee continued operation at night or under cloudy conditions when power provided by the solar cells 332 is insufficient. The solar cells 332 may be dimensioned to enable powering the access point 300 while also recharging the battery 334. Alternatively, the access point 300 may be powered externally (e.g., using power over Ethernet (PoE) or using a dedicated power input). The power/charge controller 336 in combination with the access point processing engine 342 may provide charging, battery status and power consumption analytics, enabling power management of the access point 300. A direct current (DC) power and data over DC power link may be used to power the access point 300 by the power system, but also to enable the power/charge controller 336 to communicate status information (such as battery level, temperature, etc.) to the access point 300 or the satellite communication terminal 210.

Figures 3F, 3G:
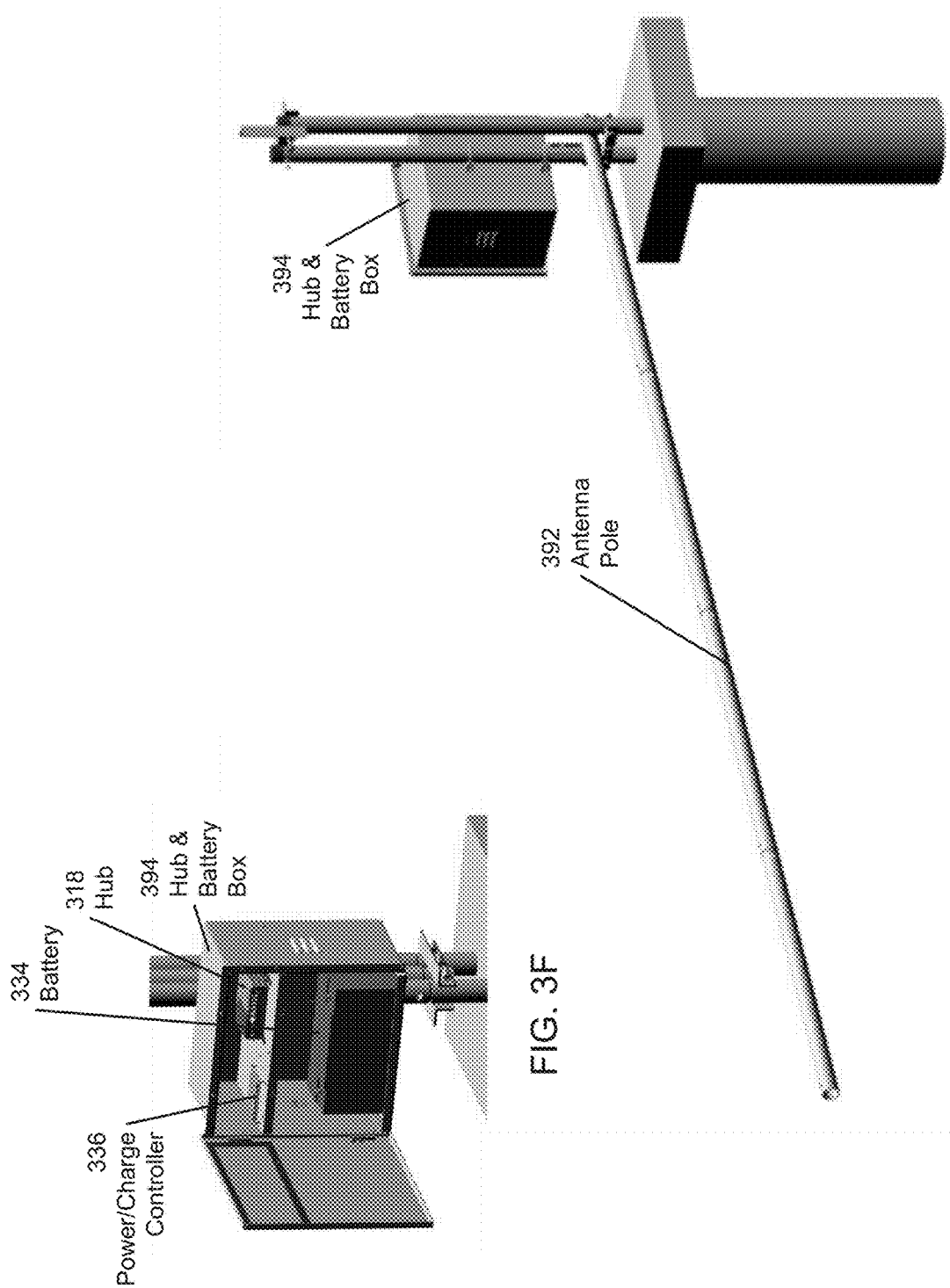

FIGS. 3C-3G show a combined access point & hub assembly, in accordance with one or more embodiments of the invention. The access point & hub assembly 390 includes the access point 300, an antenna pole 392, solar cells 332 and a hub & battery box 394. Alternatively, the access point & hub assembly 390 may be powered by AC line voltage, either continuously or intermittently. In one or more embodiments, the access point & hub assembly 390 may not be equipped with solar cells 332, but may instead include AC to DC conversion circuits to power the access point & hub assembly 390 and/or to charge the battery 334. While the access point 300 is installed near the top of the antenna pole 392 for improved reception, the hub 318 may be housed together with the battery 334 and the power/charge controller 336 in the hub & battery box 394, near the base of the antenna pole 392 to facilitate user access and/or maintenance. The access point 300 may be connected to the hub 318 using an Ethernet cable, which may also power the access point using PoE, or any other wired or wireless connection. In one or more embodiments, the antenna pole 392 can be pivoted into a horizontal position, thereby facilitating installation and servicing of the access point 300 near the top of the antenna pole as illustrated in FIG. 3G.

Figure 4:
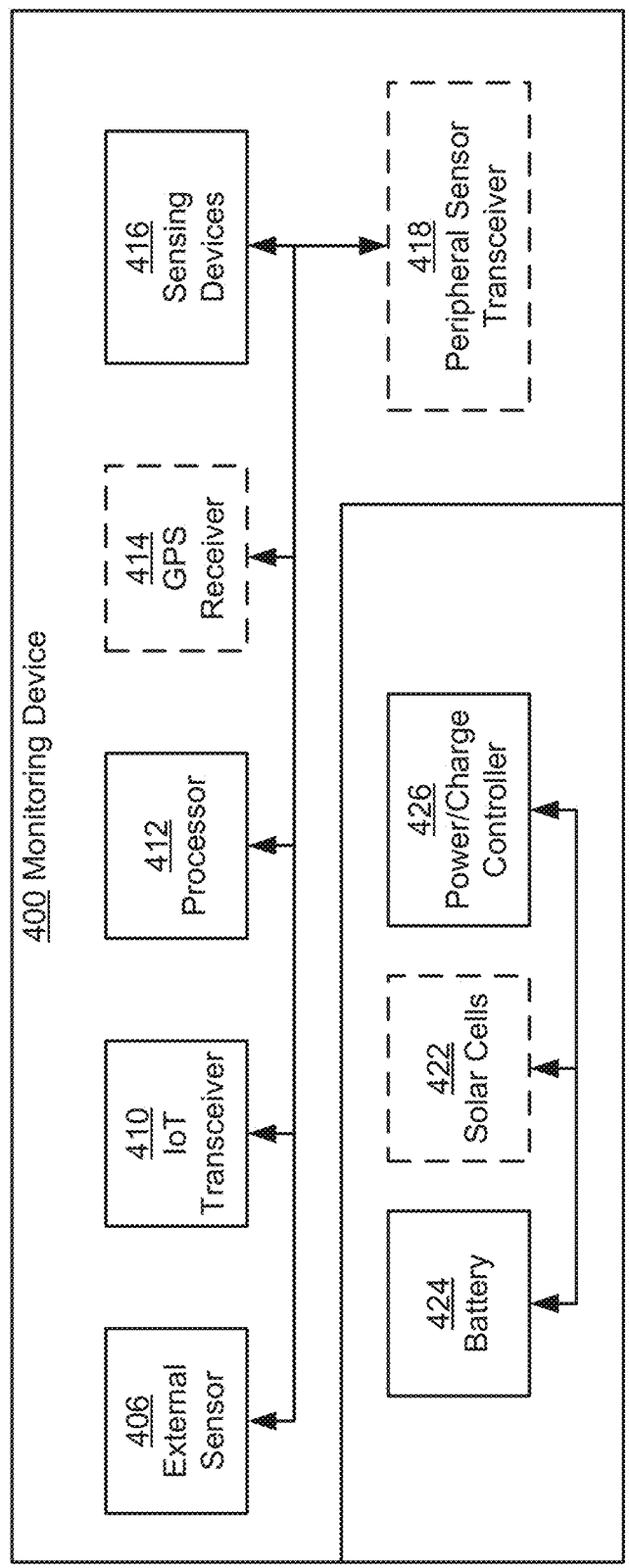
FIG. 4 shows a monitoring device of a satellite communication system, in accordance with one or more embodiments of the invention.

FIG. 4 shows a monitoring device in a field environment, in accordance with one or more embodiments of the invention. A monitoring device 400 may be used to monitor a monitored asset 102, including the location of the monitored asset 102 and other variables, as subsequently discussed. The monitoring device 400 may be equipped with a mounting or attachment element that is application specific. For example, in industrial or commercial applications, the monitoring device 400 may be permanently bolted to an equipment to be monitored. In animal applications, the monitoring device 400 may be attached using an ear pin or a collar. Further, in human applications, the monitoring device 400 may be designed as a wristband, an ankle monitor, or as a unit that can be worn in a pocket. The monitoring device 400 may further be installed on a hard hat or pair of glasses, as it may be worn by workers in the oil & gas, construction, refining, and other industries. In such applications, the monitoring device 400 may be a tag that is attached to the front or the back of a hard hat. In automotive applications, the monitoring device 400 may be a tag that is hanging from the rear view mirror. If monitoring devices 400 are used to track the location, temperature and/or fill level of portable tanks, such as propane tanks, these monitoring devices 400 may be equipped with mounts to permanently or temporarily attach the monitoring devices 400 to these tanks. Those skilled in the art will appreciate that the monitoring device 400 is suitable for many applications and may thus be adapted to include mounting elements as needed. The monitoring device 400 may further include active components, including one or more external sensors 406. Data from these external sensors 406 may be transmitted to one or more of the access points 300 using the IoT link 106. The external sensors 406 may be physiological sensors (e.g., blood pressure or heart rate sensors) or sensors for environmental variables such as temperature, humidity, etc. The external sensors 406 may have a wired, wireless, or optical interface (e.g., infrared) to the monitoring device 400.

In one or more embodiments, the monitoring device 400 includes an IoT transceiver 410. The IoT transceiver 410 may be configured to communicate with one or more access points 300, using an IoT protocol such as LoRa. Communications may include, but are not limited to, the receiving of a time base from one or more access points 300, the receiving of a configuration, the receiving of a firmware, the sending of monitoring device data (e.g., data previously collected by one of the subsequently described sensors), and/or the sending of monitoring device status data, such as errors, battery level, etc. The activity of the IoT transceiver 410 may be optimized to minimize power consumption. For example, the IoT transceiver 410 may be in a deep sleep mode whenever no transmission of data is required.

In one or more embodiments, the monitoring device 400 further includes a processor 412. The processor 412 may gather data from one or more of the subsequently described sensors and may process the data for transmission via the IoT transceiver 410. The transmissions may be performed as specified by the IoT communication protocol overlay 600, further described with reference to FIG. 6 to minimize communication inefficiencies such as collisions with data sent by other monitoring devices and/or to conserve battery power. The organization of the data as instructed by the IoT communication protocol overlay 600 may be performed by the processor 412. The processor 412 may be a microcontroller unit (MCU) that may be implemented as a system on a chip (SOC). The processor may be selected based on computational requirements and battery life requirements.

In one or more embodiments, the monitoring device 400 may include a GPS receiver 414, sensing devices 416 and/or a peripheral sensor transceiver 418. The GPS receiver 414 is optional and, if present, may be used to determine the location of the asset when other, more power efficient, methods for determining the location (such as TDOA and/or RSSI) are not available (e.g., when the number of access points 300 that are simultaneously in communication with the monitoring device 400 is insufficient) or the resulting location data is not sufficiently accurate. When not in use, the GPS receiver 414 may be in a deep sleep mode or completely powered down. One or more sensing devices 416 may be used to obtain measurements from the monitored asset 102 or the surrounding field environment. These sensing devices 416 may include, but are not limited to, pressures sensors for gas and/or liquid applications, air or gas leak sensors, fill level sensors (e.g., for storage tanks), valve position sensors (e.g., to monitor the function of valves), weight and/or strain sensors (including bending, torsion, etc.), and temperature sensors, spectroscopy sensors (to perform chemical analyses beyond basic gas sensing), energy usage/delivery sensors, etc. The one or more sensing devices 416 may be interfaced with the processor 412 using digital and/or analog interfaces.

In one or more embodiments, the monitoring device 400 is further equipped with a control interface (not shown). The control interface may include analog or digital outputs, including communication bus systems, and/or relays, motors, or any other equipment that may be used to control functions of the monitored asset 102 and/or other components in vicinity of the monitored asset. Those skilled in the art will appreciate that the control interface may be used to control any function of the monitored asset 102 or functions of other components in the monitored environment 100.

In one or more embodiments, the peripheral sensor transceiver 418 is optional and establishes a data link to one or more peripheral sensors 500 discussed below, with reference to FIG. 5. The data link may be very low power, limited to a range of only, for example, three to six feet. A transmission frequency may be in a range suitable to penetrate tissue. Highly power efficient circuits (such as class C amplification) may be used to minimize power consumption, in particular on the side of the peripheral sensor 500, which may need to operate using small batteries. The data link may use a communication protocol analogous to the protocol further described below with reference to FIG. 6, although a simplified version (e.g., fewer communication slots) may be provided.

In one or more embodiments, the components of the monitoring device 400 are battery powered. The battery 424 may be a rechargeable or a non-rechargeable battery that may or may not be replaceable, selected to power the components of the monitoring device for a specified duration, e.g., for multiple months or years. If the battery 424 is rechargeable, a power/charge controller 426 may control the charging of the battery from optional solar cells 422 or other external power sources, such as inductively provided power. The power/charge controller 426 may further communicate battery status information to the processor 412. This status information may be communicated to an access point 300 (e.g., when a low battery level is detected). In addition, the battery level may directly govern the operation of the monitoring device 400. For example, when a low battery level is detected, the communication frequency may be reduced, certain sensors may be deactivated, etc. External power supplies (not shown) may be used, e.g., if the monitoring device 400 is stationary.

Figure 5:
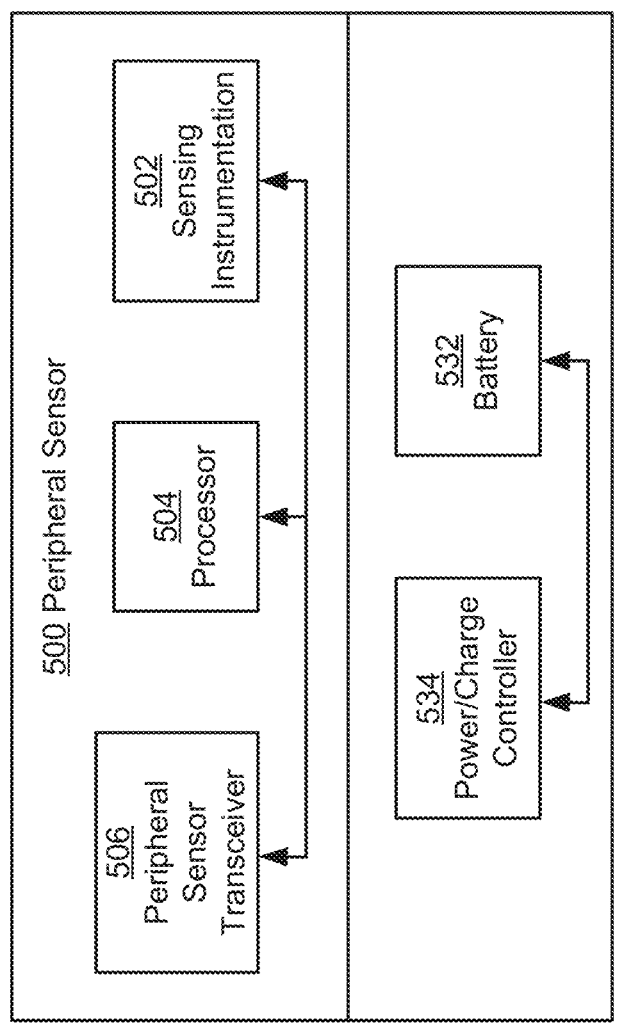
FIG. 5 shows a peripheral sensor of a system of a satellite communication system, in accordance with one or more embodiments of the invention.

FIG. 5 shows a peripheral sensor of a device in a field environment, in accordance with one or more embodiments of the invention. The peripheral sensor 500 may include a sensing instrumentation 502, a processor 504, a peripheral sensor transceiver 506, an antenna, a battery 532, and/or a power/charge controller 532. Depending on the environment for which the peripheral sensor 500 is designed, the peripheral sensor may be hermetically sealed to prevent gases, fluids, or foreign contaminants from entering the peripheral sensor. The sensing instrumentation 502 may include, but is not limited to, pressures sensors for gas and/or liquid applications, air or gas leak sensors, fill level sensors (e.g., for storage tanks or reservoirs), valve position sensors (e.g., to monitor the function of valves), weight and/or strain sensors (e.g., bending, torsion, etc.), temperature sensors, spectroscopy sensors (e.g., to perform chemical analyses beyond basic gas sensing), or energy usage/delivery sensors, but is not limited to these sensors.

In one or more embodiments, the field environment is a mining, refining or industrial environment and the device a monitoring device 400 or peripheral sensor 500 on a piece of equipment. The peripheral sensor 500 may include gas sensors, configured to provide early hazard warnings to workers, on an individual basis. Alternatively, in another scenario, a monitoring device 400 is used to monitor the fill level of a storage tank. A peripheral sensor 500, interfacing with the monitoring device 400, may further monitor a pump to monitor vibration, energy consumption, including static and transient energy consumption, and/or to control the pump, and thus, indirectly, the fill level of the storage tank. Those skilled in the art will appreciate that the peripheral sensor, when equipped with a control interface, may be used to control any function of the monitored equipment or functions of other components in the field environment.

In one or more embodiments, the peripheral sensor 500 includes a processor 504 and a peripheral sensor transceiver 506. The processor 504 may be an energy-efficient unit such as a microcontroller that may be implemented as a system on a chip (SOC). The processor 504 may be selected based on computational requirements and battery life requirements. Peripheral sensors 500 intended for temporary use may only need to remain operative for a few days, whereas a permanent peripheral sensor 500 may need to be operational for the lifetime of the monitoring device 400. The peripheral sensor transceiver 506 is configured to interface the peripheral sensor with the monitoring device 400 over a short distance using a low-power signal with minimal power requirements, in order to communicate the collected peripheral data to the monitoring device 400, which in turn forwards the data to a satellite communication terminal 210 or access point 300.

The battery 532 may be a rechargeable or a non-rechargeable battery, selected to power the components of the peripheral sensor 500 for a specified duration, ranging from a few days to the lifetime of the peripheral sensor 500. If the battery is rechargeable, a power controller 534 may control the charging of the battery 532 from inductively provided power. The power controller 534 may further communicate battery status information to the processor 504. The status information may be communicated to the satellite communication terminal 210 or the access point 300 (e.g., to trigger an alert to the user when a low battery level is detected). In addition, the battery level may directly govern the operation of the peripheral sensor 500. For example, when a low battery level is detected, the communication frequency may be reduced, certain sensors may be deactivated, etc.

FIG. 6 shows an Internet of Things (IoT) communication protocol overlay, in accordance with one or more embodiments of the invention. The IoT communication protocol overlay 600 is designed to enable the distribution of an accurate time base by an access point to devices communicating with the satellite communication terminal or an intervening device such as a hub or an access point. The IoT communication protocol overlay 600 further establishes rules for data exchanges in the form of frequency bands and time slots to be used for communications, to reduce or eliminate collisions that may otherwise occur when multiple devices attempt to simultaneously transmit data. In one or more embodiments of the invention, the IoT communication protocol overlay 600 may be used to extend existing IoT protocols such as LoRa or SigFox, but also other protocols such as the 802.11 Wi-Fi protocol. FIG. 6 shows an IoT communication protocol overlay 600 in which a superframe 602 and frames 604 are established. The beginning of each frame 604 is marked by a beacon, emitted by IoT interface or IoT radio antenna of the satellite communication terminal or intervening device. A beacon may include or may be followed by a communication of various data to the IoT devices within the range of the satellite communication terminal or intervening device. The data may include a precise time base that the satellite communication terminal may have obtained from its GPS interface. The data may further include a specification of the IoT communication protocol overlay 600, thus informing the connected IoT devices of the timing and frequency of time slots assigned to them for data transmission.

The beacon may then be followed by transmissions of data in the communication slots. Each communication slot may be of a fixed duration and may be located at a set frequency. In the exemplary IoT communication protocol overlay 600 of FIG. 6, a frame 604 includes 24 communication slots. Groups of 8 communication slots may be simultaneously transmitted using different frequencies. Communication slots may be assigned according to any appropriate method. For example, a communication by a particular IoT device may be performed using a single assigned communication slot or, if necessary, multiple communication slots that may occur in parallel at different frequencies (channels) and/or subsequently. No communication slot may be assigned to multiple devices to prevent communication collisions. A frame (x04) ends with a beacon guard time (x14), during which no communications by any of the IoT devices that rely on the IoT communication protocol overlay 600 may be allowed. However, other IoT devices that are merely capable of communicating using the underlying IoT communication protocol, but not the IoT communication protocol overlay 600, may communicate during the beacon guard time.

In total, the IoT communication protocol overlay 600 provides 72 communication slots. Accordingly, up to 72 individual communications may be performed in a single superframe 602. If these 72 communications are insufficient to serve all IoT devices, the IoT communication protocol overlay 600 may be modified in various ways without departing from the invention. For example, a superframe 602 may be configured to include more than three frames.

Additionally, or alternatively, a frame may include more than three consecutive communication slots, and/or additional frequencies (channels) may be used to allow simultaneous transmission of additional communication slots. The same IoT communication protocol overlay 600 may be used by all devices, intervening devices, and the satellite communication terminal within the field environment.

In one or more embodiments of the invention, not all channels that are available in the underlying IoT communication protocol are used by the IoT communication protocol overlay 600. Channels that are not made available may be used to support devices that are not designed to work with the IoT communication protocol overlay 600, while being able to use the underlying IoT protocols. Such channels may also be used for lengthy transmissions such as a firmware provided over the air.

Figure 7:
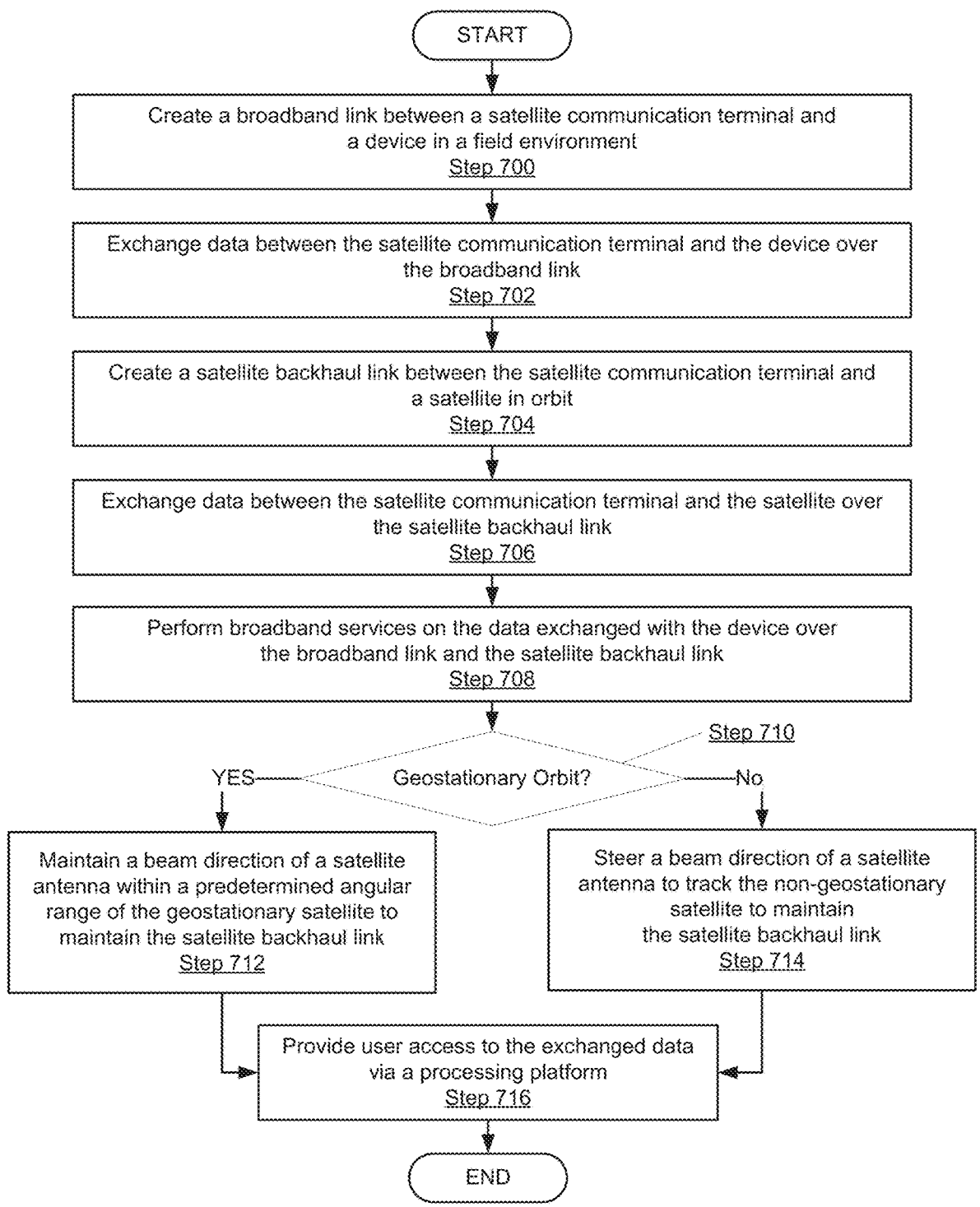
FIG. 7 shows a flowchart describing methods for managing a satellite communication terminal in a field environment, in accordance with one or more embodiments of the invention.

FIG. 7 shows a flowchart describing methods for managing a satellite communication terminal in a field environment, in accordance with one or more embodiments of the invention. The method may be used, for example, to establish a network in a field environment that lacks infrastructure to connect a user or a device to an external network (e.g., the internet, a cloud computing platform, devices located outside of the field environment). The method may be repeated or expanded to support multiple devices, multiple users, and/or multiple networks within the field environment.

It is to be understood that, one or more of the steps shown in the flowchart may be omitted, repeated, and/or performed in a different order than the order shown. Accordingly, the scope of the invention should not be considered limited to the specific arrangement of steps shown in the flowchart.

In Step 700, a broadband link is created between a satellite communication terminal and a device in the field environment. The device may be a monitored asset, a monitoring device, a monitoring system, an access point, a drone, a hub, other sensors, a peripheral sensor, a local sensor, a smartphone, a laptop, but is not particularly limited to these devices. As described above, the broadband link may be a wired or wireless connection between the device and the satellite communication terminal. Furthermore, an optional intervening device (e.g., a hub or an access point) may facilitate the broadband link between the device and the satellite communication terminal. For example, the intervening device may extend the range of the broadband link, boost signals, route/switch signals, or otherwise facilitate the broadband link connecting the satellite communication terminal and the device.

In Step 702, data is exchanged between the satellite communication terminal and the device over the broadband link. Data may be monitoring data, environmental data, networking data, flight/telemetry data, sensor data, voice/text/video data, electronic documents, or user input data, but is not particularly limited to these types of data. Furthermore, other data (i.e., data not associated with the field environment or devices in the field environment) may be exchanged. As discussed above, the exchange of data may be filtered or prioritized based on the authorization of the device or the user of the device. Exchange of the data between the satellite communication terminal and the device may be continuous, periodic, intermittent, scheduled, or triggered by an event (e.g., user interaction, environmental trigger, internal trigger). The data may be buffered by the device, the satellite communication terminal, or an intervening device.

In Step 704, a satellite backhaul link is created between the satellite communication terminal and a satellite in orbit. As discussed above, the satellite interface manages communications over the satellite backhaul link. The satellite may be one or more satellites in one or more geostationary orbits. Alternatively, the satellite may be one or more satellites in one or more non-geostationary orbits.

In Step 706, data is exchanged between the satellite communication terminal and the satellite over the satellite backhaul link. As discussed above, the exchange of data may be filtered or prioritized based on the authorization of the device or the user of the device. Exchange of the data between the satellite communication terminal and the satellite may be continuous, periodic, intermittent, scheduled, or triggered by an event (e.g., user interaction, environmental trigger, internal trigger). The data may be buffered by the satellite communication terminal or the satellite.

In Step 708, broadband services are performed on the data exchanged over the broadband link and the satellite backhaul link with the satellite communication terminal. Generally, broadband services are services that control and manage communications between connected devices in a network. For example, the satellite communication terminal may be connected to one or more local networks comprising the device and secondary devices in the field environment. Alternatively, the satellite communication terminal may be connected to one or more external networks comprising secondary devices outside of the field environment (e.g., connected via the satellite backhaul link, internet, or cloud platform).

In Step 710, the satellite communication terminal determines whether the satellite is in a geostationary orbit or a non-geostationary orbit.

When the determination in Step 710 is YES (i.e., the satellite is in a geostationary orbit), managing the satellite backhaul link continues with Step 712.

In Step 712, the satellite communication terminal maintains a beam direction of the satellite antenna within a predetermined angular range of the geostationary satellite to maintain the satellite backhaul link. The predetermined range may be determined by a minimum signal strength, characteristics of the satellite or satellite antenna, or relative position of the satellite communication terminal, but is not limited to these factors.

As discussed above, in one or more embodiments, the satellite antenna may have a fixed beam direction with respect to the spatial orientation of the satellite antenna that require a user to orient the satellite antenna within the predetermined angular range. Alternatively, the beam direction of the satellite antenna may be steered (e.g., beam-forming) without changing the orientation of the satellite antenna.

The user may be provided instructions to optimally orient the satellite antenna with respect to one or more geostationary satellites. For example, the satellite communication terminal may calculate the optimal orientation for the satellite antenna based on the location information provided by the GPS interface of the satellite communication terminal and the known coordinates of the one or more geostationary satellites. Furthermore, the satellite communication terminal may use one or more sensing devices (e.g., accelerometer or magnetometer) to acquire sensor information to determine the relative orientation of the satellite antenna.

In one or more embodiments, the sensing device may be a signal strength processor or detector that monitors the signal strength of the satellite backhaul link to determine whether the beam direction falls within the predetermined angular range of a geostationary satellites. For example, the received signal strength indicator (RSSI), the estimated signal-to-noise ratio (SNR), the bit rate error, the packet error rate, or any other appropriate signal derived estimate of signal quality of a received satellite signal may be used to calculate the satellite antenna orientation. The instructions may be provided to the user via a smartphone application or an indicator on the satellite communication terminal.

When the determination in Step 710 is NO (i.e., the satellite is in a non-geostationary orbit), managing the satellite backhaul link continues with Step 714.

In Step 714, the satellite communication terminal steers the beam direction of the satellite antenna to track the non-geostationary satellite (e.g., maintain the beam direction within a predetermined angular range of the non-geostationary satellite) to maintain the satellite backhaul link. The predetermined range may be determined by a minimum signal strength, characteristics of the satellite or satellite antenna, or relative position of the satellite communication terminal, but is not necessarily limited to these factors.

Because a non-geostationary satellite moves across the sky, the satellite communication terminal has a limited window of connectivity with a single non-geostationary satellite before it is obscured by the horizon (e.g., 10-15 minutes for Low Earth Orbit satellites). In accordance with one or more embodiments, the satellite communication terminal must coordinate between a plurality of non-geostationary satellites to maintain the satellite backhaul link. The satellite communication terminal steers the beam direction of the satellite antenna to track a first non-geostationary satellite and switch to a second non-geostationary satellite to maintain the satellite backhaul link. Concurrently, the satellite interface manages hand-off of communications between the first and the second non-geostationary satellite. The tracking and hand-off procedure may be repeated multiple times among any given number of non-geostationary satellites to maintain the satellite backhaul link. Those having ordinary skill in the art will appreciate that the tracking and hand-off procedure may also apply to any given number of geostationary satellites in accordance with Step 712.

In one or more embodiments, a processor of the satellite communication terminal may control the beam direction by physically reorienting the satellite antenna (e.g., actuators). In one or more embodiments, the processor may control the beam direction by internally manipulating the beam profile of the satellite antenna (i.e., beam-forming). Alternatively, as discussed above with respect to FIG. 2D, the processor may control the beam direction by switching between one or more of a plurality of antenna elements within the satellite antenna.

The processor may calculate the optimal orientation for the satellite antenna or the beam direction of the satellite based on the location information provided by the GPS interface of the satellite communication terminal and the known coordinates of the one or more non-geostationary satellites. Furthermore, the processor may use sensor information from one or more sensing devices (e.g., accelerometer or magnetometer) to control the relative orientation of the satellite antenna and/or the beam direction.

In one or more embodiments, the sensing device may be a signal strength processor or detector that monitors the signal strength of the satellite backhaul link to determine whether the beam direction falls within the predetermined angular range of the one or more non-geostationary satellites. For example, the received signal strength indicator (RSSI), the estimated signal-to-noise ratio (SNR), the bit rate error, the packet error rate, or any other appropriate signal derived estimate of signal quality of a received satellite signal may be used to calculate the satellite antenna orientation. The instructions may be provided to the user via a smartphone application or an indicator on the satellite communication terminal.

In Step 716, the user of the device is provided access to the exchanged data via a processing platform. As discussed above, data is made available to the user of the device via the processing platform shared between the satellite communication terminal and a cloud platform (i.e., the cloud). The user may access the data using any type of computing device that is capable of interfacing with the processing platform. Alerts may be provided to the user under certain configurable conditions. For example, an alert may be provided if an authorization or level of service associated with a device or user has been changed or exceeded.

Figure 8:
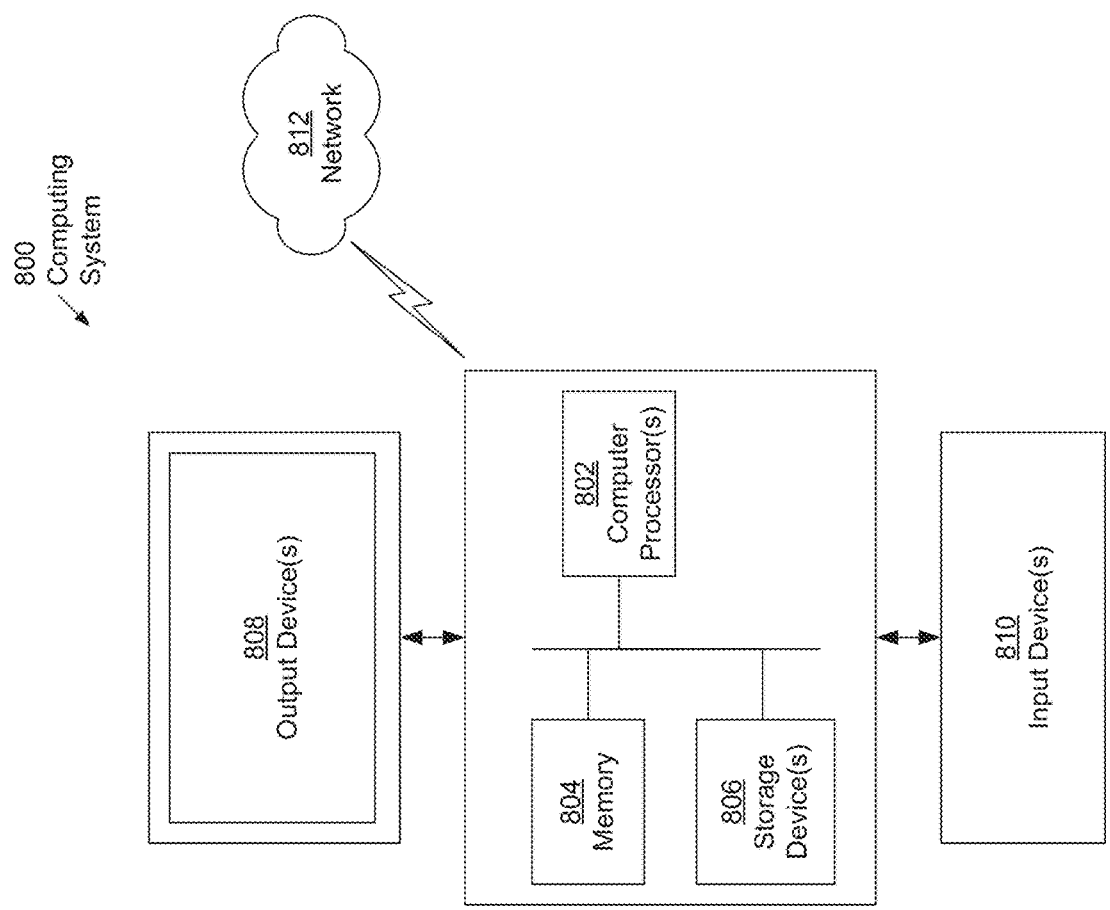
FIG. 8 shows a computing system in accordance with one or more embodiments of the invention.

FIG. 8 shows a computing system in accordance with one or more embodiments of the invention. Embodiments of the invention may be implemented on a computing system. Any combination of mobile, desktop, server, embedded, or other types of hardware may be used. For example, as shown in FIG. 8, the computing system 800 may include one or more computer processor(s) 802, associated memory 804 (e.g., random access memory (RAM), cache memory, flash memory, etc.), one or more storage device(s) 806 (e.g., a hard disk, an optical drive such as a compact disk (CD) drive or digital versatile disk (DVD) drive, a flash memory stick, etc.), and numerous other elements and functionalities. The computer processor(s) 802 may be an integrated circuit for processing instructions. For example, the computer processor(s) may be one or more cores, or micro-cores of a processor. The computing system 800 may also include one or more input device(s) 810, such as a touchscreen, keyboard, mouse, microphone, touchpad, electronic pen, or any other type of input device. Further, the computing system 800 may include one or more output device(s) 808, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 800 may be connected to a network 812 (e.g., a local area network (LAN), a wide area network (WAN) such as the Internet, mobile network, or any other type of network) via a network interface connection (not shown). The input and output device(s) may be locally or remotely (e.g., via the network 812) connected to the computer processor(s) 802, memory 804, and storage device(s) 806. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system 800 may be located at a remote location and connected to the other elements over a network 812. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Various embodiments of the invention have one or more of the following advantages. Embodiments of the invention enable an independent communication network (e.g., peer-to-peer "P2P" or full external network connection) to be setup with a single satellite communication terminal (i.e., a communication system in a box). The coverage provided by the satellite communication terminal is scalable (e.g., from small spaces to tens of thousands of acres) with the use of additional intervening devices (e.g., hubs and access points). The number of devices accessing the satellite communication terminal is scalable (e.g., from a few devices to hundreds or thousands of devices) with the use of additional intervening devices. The field environment may comprise an indoor environment, an outdoor environment, or mixed environments. In one or more embodiments, the satellite communication terminal may operate on battery and/or solar power, with no access to the power grid and under hostile conditions including, but not limited to broad temperature ranges, wind, rain, dust, insects and mechanical stress. In one or more embodiments, the satellite communication terminal may operate in environments that offer wired, wireless or no broadband Internet access.

The following use case scenarios are intended to provide examples of possible applications of the satellite communication system, in accordance with one or more embodiments of the invention. The use case scenarios are for illustrative purposes only, and the satellite communication terminal and satellite communication system is not limited to the applications discussed below.

Use Case I: Remote Location

In one or more embodiments of the invention, the field environment may be a remote location without no accessible communication infrastructure (e.g., remote wilderness or a foreign country with an incompatible communication network). The satellite communication terminal may be used to establish a local network to facilitate communication between personnel and equipment within the field environment and/or to establish communication with other networks around the world.

Use Case II: Maritime Field Environment

In one or more embodiments of the invention, the field environment may be an ocean going vessel (e.g., an offshore drilling rig, a cargo container, or cruise ship) without no externally accessible communication infrastructure (e.g., no cellular network at sea). The satellite communication terminal may be used to establish a local network to facilitate communication between personnel and equipment within the field environment and/or to establish communication with other external networks around the world.

For example, on a container ship, a satellite communication terminal may establish broadband links with laptops operated by crew members and monitoring devices attached to cargo containers. The local network maintained by the satellite communication terminal on the container ship may allow the crew members, with proper authorization, communicate with each other via broadband link or access information from the monitoring devices via IoT link. The satellite communication terminal may allow personnel on land, with proper authorization, access to information from the monitoring device via IoT link by connecting through the satellite backhaul link to the satellite communication terminal. Further, the satellite communication terminal may allow the crew members to conduct telephone calls, via broadband link and the satellite backhaul link, with the personnel on land. When the container ship approaches a port and enters the coverage area of an external network (e.g., external cellular network or wired connection in port), the satellite communication terminal may seamless handoff the telephone call (or other appropriate data service) to the external network.

Use Case III: S.O.S. Emergency Network

In one or more embodiments of the invention, the field environment may be a disaster or emergency site with a damaged or unreliable communication network. The satellite communication terminal may be used to establish a local network to facilitate communication between personnel and equipment within the field environment and/or to establish communication with a logistics or humanitarian support network.

Although the invention has been described with respect to a limited number of embodiments, those skilled in the art, having benefit of this disclosure, will appreciate that other embodiments may be devised that do not depart from the scope of the invention. Accordingly, the scope of the invention should be limited only by the attached claims.

REFERENCE NUMERALS

100 Field Environment
102 Monitored Asset
104 Monitoring Device
106 IoT Link
110 Satellite Communication System
112 Access Point
112A Primary Access Point
112B Secondary Access Point
117 Drone
118 Hub
119 Satellite Communication Terminal
120 Broadband Link
122 Other Sensors
124 Peripheral Sensor
126 Local Sensor
128 Smartphone
130 Laptop
144 Satellite Backhaul Link
145 Satellite
146 Satellite Base Station
150 Cloud
152 Cloud Server
192 Network Segment 1
194 Network Segment 2
196 Coverage Region
198 Extended Coverage Region
210 Satellite Communication Terminal
212 Satellite Interface
213 Satellite Antenna
213A Satellite Antenna
213B Antenna Element
213C Satellite Antenna
214 Broadband Interface
215 Broadband Antenna
216 Processor
218 GPS Interface
219 GPS Antenna
220 Internet of Things (IoT) Interface
221 IoT Radio Antenna
222 Sensing Device
224 Battery
226 Solar Cells
228 Power/Charge Controller
230 Control Interface
234 App Service
240 Cloud
242 App Service
250 User Application
270 Processing Platform
272 Core Services
274 IoT Services
276 Broadband Services
278 Application/Environment-Specific Services
300 Access Point
302 Broadband Antenna
304 Broadband Interface
312 GPS Antenna
314 GPS Interface
318 Hub
322 IoT Radio Antenna
332 Solar Cells
334 Battery
336 Power/Charge Controller
324 IoT Interface
342 Access Point Processing Engine
344 Device Localization Engine
390 Access Point and Hub Assembly
392 Antenna Pole
394 Hub and Battery Box
400 Monitoring Device
406 External Sensor
410 IoT Transceiver
412 Processor
414 GPS Receiver
416 Sensing Devices
418 Peripheral Sensor Transceiver
424 Battery
422 Solar Cells
426 Power/Charge Controller
500 Peripheral Sensor
502 Sensing Instrumentation
504 Processor
506 Peripheral Sensor Transceiver
532 Battery
534 Power/Charge Controller
600 IoT Communication Protocol Overlay
602 Superframe
604 Frame
800 Computing System
802 Computer Processor(s)
804 Memory
806 Storage Device(s)
808 Output Device(s)
810 Input Device(s)
812 Network

What is claimed is:

1. A satellite communication terminal for a field environment, the satellite communication terminal comprising:
   a broadband interface that creates a broadband link with a device in the field environment and that manages communication over the broadband link;
   a satellite antenna that creates a satellite backhaul link with a satellite in orbit;
   a satellite interface that manages communication over the satellite backhaul link; and
   a processor that:
      controls a beam direction of the satellite antenna;
      performs broadband services on data exchanged with the device over the broadband link and the satellite backhaul link; and
      provides access to the exchanged data to the device, wherein
   the satellite in orbit comprises a plurality of non-geostationary satellites,
   the processor repeatedly controls the beam direction of the satellite antenna to maintain the satellite backhaul link with the plurality of non-geostationary satellites, and
   the processor manages hand-off of the satellite backhaul link between the plurality of non-geo stationary satellites.

2. The satellite communication terminal of claim 1, further comprising:
   a GPS antenna and a GPS interface that provide location information of the satellite communication terminal, wherein
   the processor uses the location information to control the beam direction of the satellite antenna.

3. The satellite communication terminal of claim 1, further comprising:
   an Internet of Things (IoT) interface that creates an IoT link with an IoT device in the field environment.

4. The satellite communication terminal of claim 1, further comprising:
   a sensing device comprises at least one selected from a group comprising of an accelerometer, a magnetometer, and a signal strength processor, wherein
   the sensing device provides sensor information about the satellite communication terminal, and
   the processor uses the sensor information to control the beam direction of the satellite antenna.

5. The satellite communication terminal of claim 1, wherein
   the satellite in orbit further comprises a geostationary satellite, and
   the processor controls the beam direction of the satellite antenna within a predetermined range to maintain the satellite backhaul link with the geostationary satellite.

6. The satellite communication terminal of claim 1, wherein
   the broadband services comprise managing an authorization of the user to communicate within a local network connected to the satellite communication terminal or an external network connected to the satellite.

7. The satellite communication terminal of claim 6, wherein
   the authorization comprises a level of service within the local network connected to the satellite communication terminal or the external network connected to the satellite.

8. The satellite communication terminal of claim 1, wherein
   the broadband services comprise managing an authorization of the device to communicate within a local network connected to the satellite communication terminal or an external network connected to the satellite.

9. The satellite communication terminal of claim 1, wherein
   the broadband services comprise at least one selected from a group comprising of data aggregation, data filtering, data fusion, data compression, and data encryption.

10. A method of managing a satellite communication terminal in a field environment, the method comprising:
    creating a broadband link between the satellite communication terminal and a device in the field environment;
    exchanging data between the satellite communication terminal and the device over the broadband link;
    creating a satellite backhaul link between the satellite communication terminal and a satellite in orbit;
    exchanging the data between the satellite communication terminal and the satellite over the satellite backhaul link;
    performing broadband services on the exchanged data;
    controlling a beam direction of a satellite antenna to maintain the satellite backhaul link; and
    providing access to the exchanged data to the device, wherein
    the satellite in orbit comprises a plurality of non-geostationary satellites, and
    controlling the beam direction of the satellite antenna is repeatedly performed to maintain the satellite backhaul link with the plurality of non-geostationary satellites and further comprises handing-off the satellite backhaul link between the plurality of non-geostationary satellites.

11. The method of claim 10, wherein
    the satellite in orbit further comprises a geostationary satellite, and
    controlling the beam direction of the satellite antenna is performed within a predetermined range to maintain the satellite backhaul link with the geostationary satellite.

12. The method of claim 10, wherein
    performing broadband services comprises managing an authorization of the user to communicate within a local network connected to the satellite communication terminal or an external network connected to the satellite.

13. The method of claim 12, wherein
    the authorization comprises a level of service within the local network connected to the satellite communication terminal or the external network connected to the satellite.

14. A satellite communication system for a field network, the system comprising:
    a device in the field environment;
    a satellite in orbit; and
    a satellite communication terminal including:
       a broadband interface that creates a broadband link with a device in the field environment and that manages communication over the broadband link;
       a satellite antenna that creates a satellite backhaul link with a satellite in orbit;
       a satellite interface that manages communication over the satellite backhaul link; and a processor that:
  controls a beam direction of the satellite antenna;
  performs broadband services on data exchanged with the device over the broadband link and the satellite backhaul link; and
  provides access to the exchanged data to the device,
wherein
the satellite in orbit comprises a plurality of non-geostationary satellites, and
the processor repeatedly controls the beam direction of the satellite antenna to maintain the satellite backhaul link with the plurality of non-geostationary satellites, and
the processor manages hand-off of the satellite backhaul link between the plurality of non-geo stationary satellites.

15. The system of claim 14, wherein
the broadband services comprise managing an authorization of the user to communicate within a local network connected to the satellite communication terminal or an external network connected to the satellite.

16. The system of claim 15, wherein
the authorization comprises a level of service within the local network connected to the satellite communication terminal or the external network connected to the satellite.

17. The system of claim 14, wherein
the satellite in orbit further comprises a geostationary satellite, and
the processor controls the beam direction of the satellite antenna within a predetermined range to maintain the satellite backhaul link with the geostationary satellite.

* * * * *